(12) United States Patent
Nagata et al.

(10) Patent No.: US 7,668,143 B2
(45) Date of Patent: Feb. 23, 2010

(54) WIRELESS PACKET COMMUNICATION METHOD AND APPARATUS

(75) Inventors: Kengo Nagata, Yokohama (JP); Tomoaki Kumagai, Yokosuka (JP); Shinya Otsuki, Yokohama (JP); Kazuyoshi Saito, Hachioji (JP); Satoru Aikawa, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 489 days.

(21) Appl. No.: 10/549,240

(22) PCT Filed: Jul. 26, 2004

(86) PCT No.: PCT/JP2004/010986

§ 371 (c)(1),
(2), (4) Date: Sep. 12, 2005

(87) PCT Pub. No.: WO2005/013576

PCT Pub. Date: Feb. 10, 2005

(65) Prior Publication Data

US 2006/0251028 A1 Nov. 9, 2006

(30) Foreign Application Priority Data

Jul. 30, 2003 (JP) ............... 2003-203630
Aug. 29, 2003 (JP) ............... 2003-209582

(51) Int. Cl.
*H04J 3/00* (2006.01)
*H04B 7/212* (2006.01)
(52) U.S. Cl. ...................... 370/337; 370/346
(58) Field of Classification Search ................. 370/329, 370/346, 337
See application file for complete search history.

(56) References Cited

U.S. PATENT DOCUMENTS 6,721,302 B1 * 4/2004 Alastalo ..................... 370/346

(Continued)

FOREIGN PATENT DOCUMENTS

JP 2003-125018 A 4/2003

(Continued)

OTHER PUBLICATIONS

International Standard ISO/IEC 8802-11 ANSI/IEEE Std 802.11, 1999 edition, Information technology—Telecommunications and information exchange between systems—Local and metropolitan area networks— Specific requirements—Part 11: Wireless LAN Medium Access Control (MAC) and Physical Layer (PHY) specifications.

(Continued)

*Primary Examiner*—William D Cumming
(74) *Attorney, Agent, or Firm*—Harness, Dickey & Pierce, P.L.C.

(57) ABSTRACT

For data packet transmission in special format generated by connecting or patching data frames, a request packet and reply packet receivable only by STAs supporting the special format are transmitted/received before the data packet transmission, to check and manage the STA supporting the special format. Based on management information in own station, the data packet is transmitted in the special or standard format according to a receive-side STA. For generating plural data packets in special format in which plural data frames are patched, the plural data frames having subheaders added are connected and divided to data blocks. A main header including information necessary to restore patched data frames are added to each data block, and a control information field and a frame check field of a data packet are added before and after the data block having the main header added thereto, respectively, to generate data packets.

16 Claims, 24 Drawing Sheets

U.S. PATENT DOCUMENTS 6,804,220 B2 * 10/2004 Odenwalder et al. ........ 370/337

FOREIGN PATENT DOCUMENTS

| WO | 01/54337 A1 | 7/2001 |
| WO | WO 02/13398 | 2/2002 |
| WO | WO 02/41647 | 5/2002 |
| WO | WO 02/091767 | 11/2002 |
| WO | WO 03/049308 | 6/2003 |

OTHER PUBLICATIONS

IEEE Std 802.11-1997, Information technology—Telecommunications and information exchange between systems—Local and metropolitan area networks—specific requirements—Part 11: Wireless LAN Medium Access Control (MAC) and Physical Layer (PHY) specifications.

"Low -Powered Data Communication System/Broadband Mobile Access Communication System" (CSMA) standard, ARIB STD-T71 version 1.0, Association of Radio Industries and Businesses, 2000, sections 6.2.4.1.1 and 6.2.4.2 - 6.2.4.2.10.

Kurosaki, Satoshi, et al., "100Mbit/s SDM-COFDM over MIMO Channel for Broadband Mobile Communications," Technical Report of the Institute of Electronics, Information and Communication Engineers, A P2001-96, RCS2001-135, Oct. 2001, pp. 37-42.

* cited by examiner

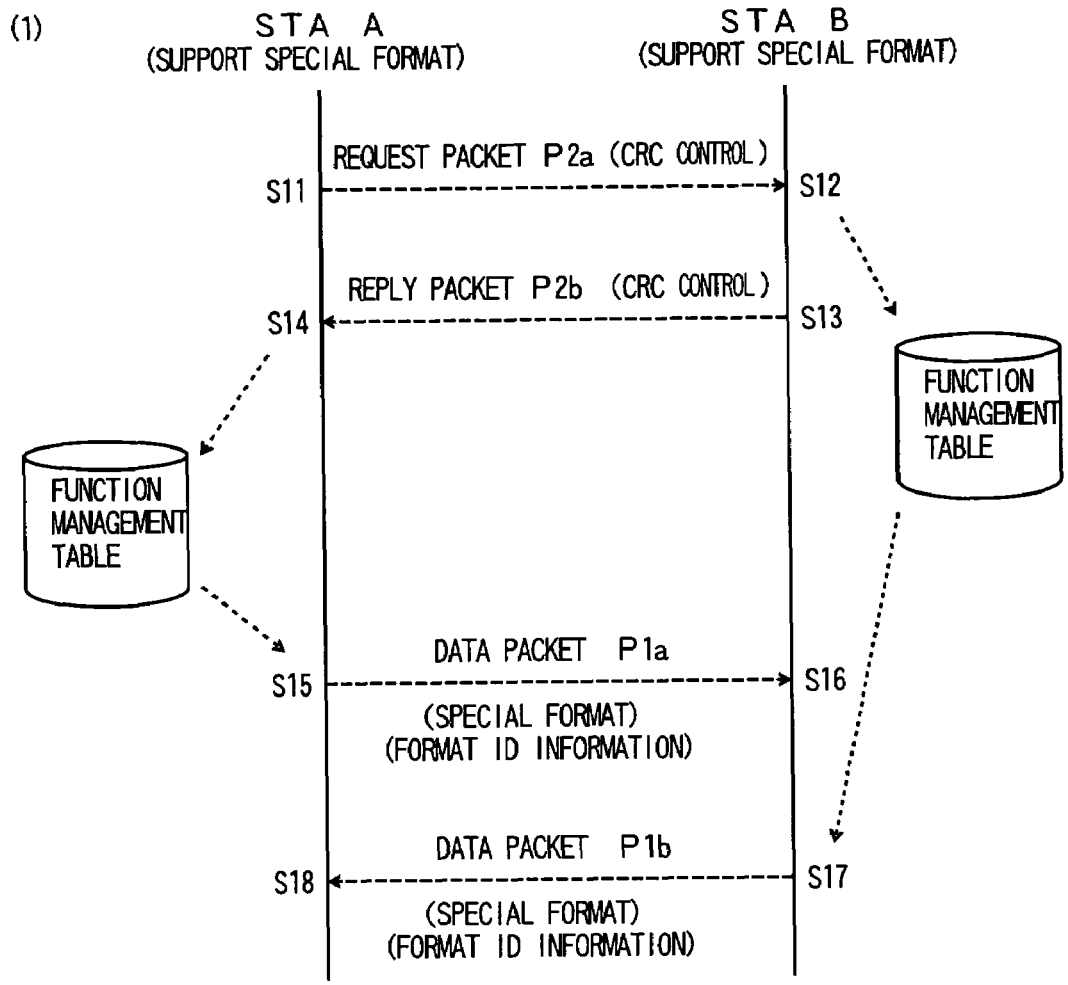

FIG. 16
DATA PACKET 1
(1)  (2)  (3)
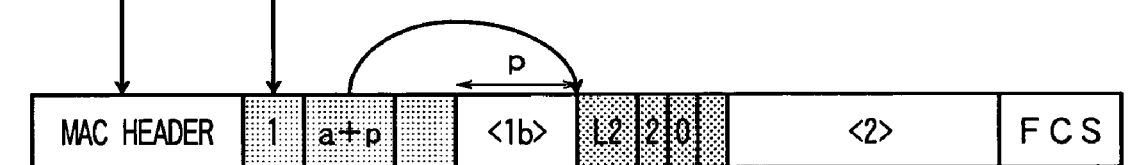
(4)  (6)  (5)
DATA PACKET 2

FIG. 21
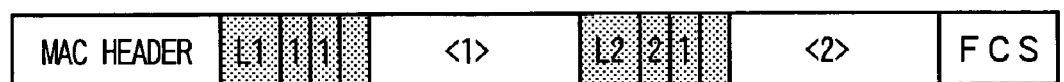
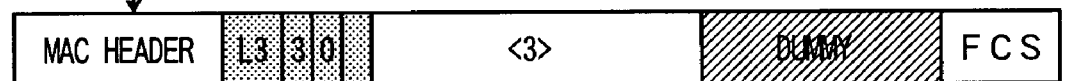

FIG. 24
(1)
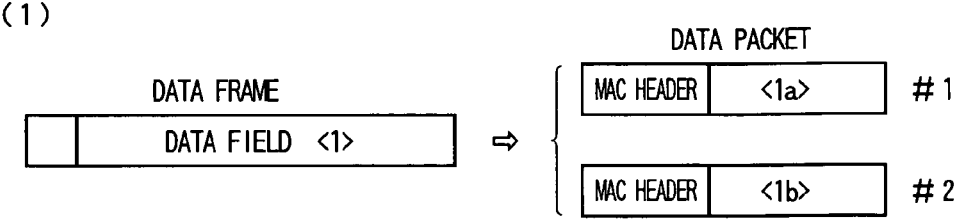
(2)
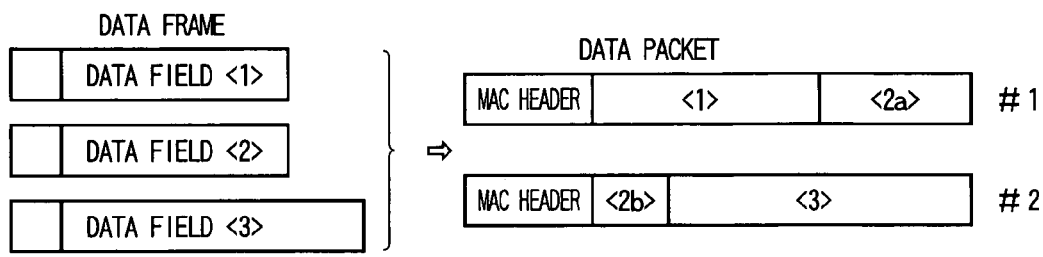
(3)
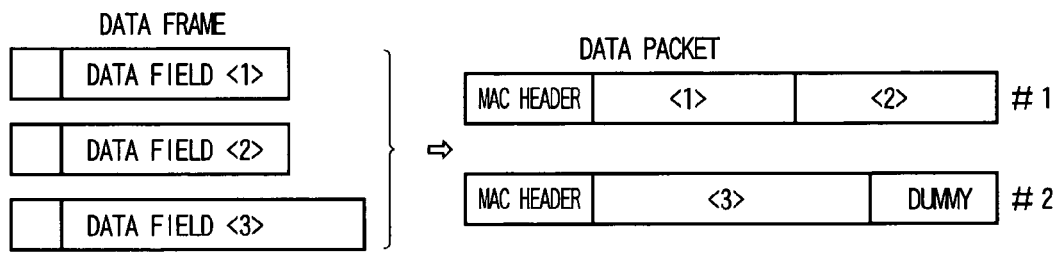
(4)
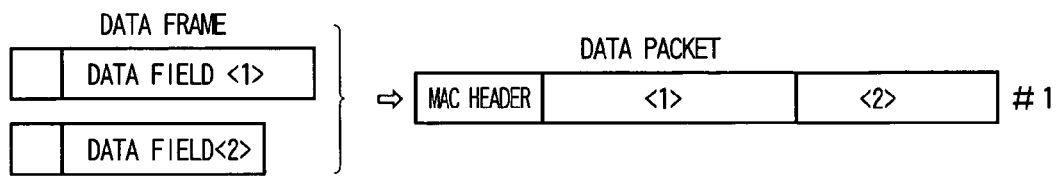

WIRELESS PACKET COMMUNICATION METHOD AND APPARATUS

CROSS-REFERENCE TO RELATED APPLICATION

This application is based upon and claims the benefit of priority from Japanese Patent Application No. 2003-203630, filed Jul. 30, 2003, and Application No. 2003-209582, filed Aug. 29, 2003, the entire contents of which are incorporated herein by reference.

TECHNICAL FIELD

The present invention relates to a wireless packet communication method for transmitting/receiving a data frame in a special format which is generated by connecting or patching a plurality of data frames. The plural data packets generated by connecting or patching the plurality of data frames are applied to simultaneous transmission utilizing multiple wireless channels and Multiple Input Multiple Output (hereinafter, MIMO) technique, for example.

BACKGROUND ART

According to the conventional wireless packet communication method in compliance with standard specifications, only one wireless channel to be used is decided in advance, whether the wireless channel is available or not is detected (carrier sense) prior to transmission of the data packet, and one data packet is transmitted only when the wireless channel is available. Such control allows one wireless channel to be shared among a plurality of stations (hereinafter, STA) by staggering times ((1) "International Standard ISO/IEC 8802-11 ANSI/IEEE Std. 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications"; (2) "Low-powered Data Communication System/Broadband Mobile Access Communication System (CSMA) Standard", ARIB STD-T71 version 1.0, Association of Radio Industries and Businesses, settled in 2000).

According to the wireless packet communication method like this, the wireless packet communication method which uses the known MIMO technique (Kurosaki et al., "100 Mbit/s SDM-COFDM over MIMO Channel for Broadband Mobile Communications", Technical Reports of the Institute of Electronics, Information and Communication Engineers, A•P2001-96, RCS2001-135 (2001-10)) to perform simultaneous transmission of the plural data packets through one wireless channel, in order to improve transmission efficiency of the data packets, is under study. This space division multiplexing technique (SDM) is the system for simultaneously transmitting the different data packets from each of plural antennas using the same wireless channel, and receiving the plural data packets which are simultaneously transmitted using the same wireless channel by digital signal processing corresponding to a difference in propagation coefficients of the respective data packets received in plural antennas of the opposing STA. The number of MIMOs is decided according to the propagation coefficient and the like.

Moreover, the wireless packet communication method in which each STA has plural wireless network interfaces and, when the multiple wireless channels are available in carrier sense, performs the simultaneous transmission of the plural data packets using the multiple wireless channels, in order to improve the transmission efficiency of the data packets, is under study.

Furthermore, the wireless packet communication method in which the number of data packets corresponding to the total number of MIMOs of the multiple wireless channels are simultaneously transmitted by combining the multiple wireless channels and the MIMO technique is also under study.

According to such methods, when there are the two available wireless channels for the three data packets, for example, the two data packets out of three are simultaneously transmitted using the two wireless channels. Further, when there are the three available wireless channels for the two data packets, all (two) of the data packets are simultaneously transmitted using the two wireless channels. This also applies to the case where the MIMO technique is used.

According to the method of performing the simultaneous transmission of the plural data packets using the multiple wireless channels, the influence of leakage power which leaks from one wireless channel to a frequency band used by the other wireless channel is significant when center frequencies of the multiple wireless channels used simultaneously are close to each other. In general, when transmitting the data packet, the transmit-side STA transmits the data packet, and thereafter, the receive-side STA returns an acknowledge packet (ACK packet, NACK packet) to the transmit-side STA in response to the received data packet. The influence of the leakage power from another wireless channel used in the simultaneous transmission presents the problem when the transmit-side STA is receiving this acknowledge packet.

For example, as shown in FIG. 23, the case is supposed that the central frequencies of a wireless channel #1 and a wireless channel #2 are close to each other and transmission times of the data packets to be transmitted simultaneously from the respective wireless channels are different. In this case, since the data packet transmitted from the wireless channel #1 is short, the wireless channel #2 is performing transmission when the ACK packet in response thereto is received. Accordingly, there is the possibility that the wireless channel #1 cannot receive the ACK packet due to the leakage power from the wireless channel #2. Under such circumstances, it is impossible to improve throughput even though the simultaneous transmission is performed using the multiple wireless channels.

Such a case is caused due to a difference in packet time lengths (transmission time=data size) of the respective data packets when transmission rates of the respective wireless channels are equal to each other, and is caused due to a difference in the packet time lengths (transmission time=data size/transmission rate) of the respective data packets when the transmission rates of the respective wireless channels are taken in account.

Further, according to a wireless LAN system, data sizes of the data frames inputted from a network are not constant. Therefore, when the inputted data frames are sequentially converted to the data packets to be transmitted, the packet time lengths (transmission times) of the respective data packets also change. Therefore, when there is the difference in the packet time lengths between the plural data packets as shown in FIG. 23, there is the high possibility that the ACK packet fails to be received even though these are transmitted in parallel simultaneously.

Relating to such problems, the method of allowing the transmission of the plural data packets to complete simultaneously or almost simultaneously by making the packet time lengths of the plural data packets to be transmitted simultaneously the same or almost the same is under study. According to this method, the transmitting station is not performing the transmission at the time when the ACK packet arrives in response to each of the plural data packets. Therefore, all the ACK packets in response to the data packets which are transmitted simultaneously can be received without being influenced by the leakage power between the wireless channels and the like, which makes it possible to contribute to the improvement of the throughput. The "simultaneous transmission" in this description refers to the state in which the plural data packets with uniform packet time length (transmission time) are transmitted simultaneously. This also applies to the case of the MIMO transmission.

Now, there are the following three ways of generating the plural data packets to be transmitted simultaneously from the data frames. When the data frame is one and the number of idle channels is two, for example, the two data packets having the same packet time length are generated by fragmenting the data frame as shown in FIG. 24(1). Further, when the data frames are three and the number of idle channels is two, the two data packets having the same packet time length are generated by dividing a data frame 2, for example, and connecting these to a data frame 1 and a data frame 3, respectively, as shown in FIG. 24(2). Alternatively, it is the same when the three data frames are connected and then divided into two. Further, as shown in FIG. 24(3), the data frame 1 and the data frame 2 are aggregated and dummy bits are added to the data frame 3, to generate the two data packets having the same packet time length. When the transmission rates of the respective wireless channels are different in using the multiple wireless channels, adjustment is made by bringing size ratio of the respective data packets into correspondence with transmission rate ratio so that the packet time lengths become the same.

Further, according to the wireless LAN system, one data frame is converted to one MAC (Media Access Control) frame. Therefore, even when the data size of a data field in the data frame is small, it is converted to one MAC frame and transmitted as one data packet (for wireless transmission). For example, the maximum size of the data field in the MAC frame of IEEE802.11 standard is 2296 bytes, whereas, in an Ethernet (Trademark) frame which is used as the data frame in general, the data size of the data field is limited to 1500 bytes at the maximum. Accordingly, the Ethernet frame having the maximum size has a margin with respect to the maximum size (2296 bytes) of the data field in the MAC frame. Namely, according to the conventional system, the maximum data size which can be transmitted by one MAC frame is not utilized efficiently, and there is the limit to the improvement of the throughput.

Therefore, in order to utilize the data size of the data packet to the greatest extent possible, the method of aggregating the data fields of the plural data frames and transmitting these as one data packet, as shown in FIG. 24(4), is also under study. In the methods shown in FIG. 24(1) to (3), the connection of the data frames and the like is performed in the range of the maximum size of the MAC frame.

Now, it is possible to deal with the plural data packets generated by the division of the frame as shown in FIG. 24(1) according to the frame format in compliance with the standard specifications based on the conventional fragment processing. Meanwhile, the data packets which are reconstructed by patching the data frames as shown in FIG. 24(2) and aggregating the data frames as shown in FIGS. 24(3) and (4) are in a special format which is not in compliance with the standard specifications.

However, it is needless to say that, in such a data packet in the special format, the data field of the data frame and the data field of the data packet are not in one-to-one correspondence. Meanwhile, the receive-side STA needs to restore the original data frames from the received data packet, but the restoration from the as-is data packet is not possible because its packet format is unexpected conventionally. The reasons are as follows.

When an IP packet in an IP layer is transferred to a lower layer in the actual system, for example, the processing of transferring it is performed by fragmenting it into several data frames. In this case, headers for restoring the original IP packet are respectively added to head parts of the data fields of the respective data frames formed by the fragmentation. When a receive-side STA receives the data packets formed by thus-generated data frames, it extracts the data frames from the data packets, and then restores the original IP packet.

Generally, in the IP layer of the receive-side STA, restoring processing on the IP packet is performed by automatically recognizing that the head part of the data field of each of the received data frames is header information necessary to restore the original IP packet. Namely, from the viewpoint of the IP layer, the problem is caused when the head part of the data field in each data frame is not the header information to restore the original IP packet.

However, in the data packet which is reconstructed by patching or aggregating on the transmit side as described above, the header information to restore the original IP packet is moved to the part other than the head of the data field in each data frame, and therefore the IP packet cannot be restored from the as-is data packet in the IP layer. Therefore, before restoring the IP packet, it is necessary for the receive-side STA to first restore from the received data packet the original data frames before the reconstruction.

In order for receive-side STA to restore the data frames before the reconstruction from the data packet in the special format which is reconstructed on the transmit side, information on whether the data packet is in the special format or not, and when it is in the special format, information such as the boundary of the data frames and the order of the data packets are necessary. However, since a field for transmitting such information is not defined in a standard format, it is necessary to transmit the information from the transmit side to the receive side by the special format which is newly defined. However, when the special format which is not defined generally is adopted by the entire communication system, all the STAs which constitute the communication system must be replaced by new devices supporting the special format, and therefore increase in cost is unavoidable.

It is an object of the present invention to realize the wireless packet communication method which enables transmission/reception of the data packet in the special format, recognizing that it is in the special format, and the restoring processing on the data frame before the reconstruction in the wireless packet communication method in which the data packet in the standard format is transmitted/received.

DISCLOSURE OF THE INVENTION

According to a first aspect of the invention, in the case of transmitting a data packet in a special format which is generated by connecting or patching a plurality of data frames and a data packet in a standard format which is generated from one data frame between STAs, the STA supporting the special format transmits a request packet which is receivable only by the STA supporting the special format, before transmitting the data packet. The STA having received the request packet and supporting the special format manages a transmit-side STA of the request packet as one supporting the special format, and transmits to the STA a reply packet which is receivable only by the STA supporting the special format. The STA having received the reply packet and supports the special format manages the transmit-side STA of the reply packet as the one supporting the special format. Then, it transmits the data packet in the special format when the receive-side STA supports the special format, and transmits the data packet in the standard format when it does not support the special format, based on management information in an own station.

Thereby, it is possible to manage the formats which the respective STAs support, and transmit the data packet in the format which the receive-side STA supports, even when the STA supporting the special format and the STA supporting the standard format are both present.

According to a second aspect of the invention, the STA transmitting the data packet sets format identification information at least indicating a distinction between the standard format and special format in a control information field in the data packet to be transmitted. The STA having received the data packet selects the standard format or special format according to contents of the format identification information included in the control information field in the received data packet, and subjects the data packet to reception processing according to a definition of the selected format.

Thereby, it is possible to manage the formats which the respective STAs support, recognize the format notified from the format identification information, and transmit/receive the data packets in the respective formats, even when the STA supporting the special format and the STA supporting the standard format are both present.

According to a third aspect of the invention, the STA having received the data packet identifies the transmit-side STA from a control information field in the received data packet, recognizes the format supported by the transmit-side STA according to the management information in the own station, and subjects the data packet to reception processing according to a definition of the recognized format.

Thereby, it is possible to manage the formats which the respective STAs support, check the format of the transmit-side STA, and transmit/receive the data packets in the respective formats, even when the STA supporting the special format and the STA supporting the standard format are both present.

According to a forth aspect of the invention, in the case of generating a plurality of data packets in a special format in which a plurality of data frames are patched, a subheader including a field indicating a data size, a field indicating an order of the frame, and a field indicating presence/absence of a subsequent frame is added to each of the plurality of data frames. Next, one data block is generated by connecting the data frames having added the subheaders thereto, and a number of data blocks corresponding to a number of simultaneous transmissions are generated by dividing the one data block so that the respective data blocks have a uniform packet time length. Next, a main header including information necessary to restore the patched data frames is added to each of the number of data blocks corresponding to the number of simultaneous transmissions, and further a control information field of the data packet is added before the data block having the main header added thereto and a frame check field of the data packet is added thereafter, to generate the data packets.

Thereby, it is possible to define the special format and transmit/receive the data packet in the special format.

According to a fifth aspect of the invention, the main header includes a class field indicating a structure of the main header according to the number of data frames and fragments included in the data packet, a frame number field indicating the number of frames in the data packet, a first frame starting position field indicating a frame starting position in the data packet in unit of byte, and a fragment field indicating the presence/absence of the fragment as a divided data frame and a position thereof.

According to a sixth aspect of the invention, the main header includes a class field indicating a structure of the main header according to the number of data frames and fragments included in the data packet, and a first frame starting position field indicating a frame starting position in the data packet in unit of byte.

According to a seventh aspect of the invention, the main header is formed without the field(s) except for the class field when the numbers of data frames and fragments in the data packet are one.

An eighth aspect of the invention is the procedure for restoring the data packet in the fifth aspect of the invention. The structure of the main header is checked according to a value of the class field of the main header in each data packet received. Further, the starting position of the subheader of the data frame is recognized according to the value of the first frame starting position field of the main header in the data packet, and the corresponding data frame is cut out from the data size of the subheader. Furthermore, according to the values of the frame number field and the fragment field of the main header in the data packet, the corresponding data frame is cut out from the data size of the subheader when the data frame follows, and connecting processing with the fragment at a head of the subsequent data packet is performed when the fragment follows. Thereby, it is possible to restore the plural data frames included in each data packet received.

A ninth aspect of the invention is the procedure for restoring the data packet in the sixth aspect of the invention. The structure of the main header is checked according to a value of the class field of the main header in each data packet received. Further, the starting position of the subheader of the data frame is recognized according the value of the first frame starting position field of the main header in the data packet, and the corresponding data frame is cut out from the data size of the subheader. Furthermore, the data size of the subheader following the cut-out data frame is compared with a size of a portion subsequent to the subheader to distinguish whether it is the data frame or the fragment as a divided data frame, the corresponding data frame is cut out from the data size of the subheader when the data frame follows, and connecting processing with the fragment at a head of the subsequent data packet is performed when the fragment follows. Thereby, it is possible to restore the plural data frames included in each data packet received.

A tenth aspect of the invention is the procedure for restoring the data packet in the seventh aspect of the invention. The structure of the main header is checked according to a value of the class field of the main header in each data packet received. Further, the data size of the subheader is compared with a size of a portion subsequent to the subheader to distinguish whether it is the data frame or the fragment as a divided data frame, when the numbers of data frame and fragment are one according to the structure of the class field, the corresponding data frame is cut out from the data size of the subheader when the data frame follows, and connecting processing with the fragment at a head of the subsequent data packet is performed when the fragment follows. Thereby, it is possible to restore the data frame included in the received data packet.

According to an eleventh aspect of the invention, in the case of generating one or a plurality of data packet(s) in a special format in which a plurality of data frames are aggregated, subheaders each of which includes a field indicating a data size, a field indicating an order of the frame, and a field indicating presence/absence of a subsequent frame are added to the data frames. Next, a data block is generated by aggregating the data frames having added the subheaders thereto. Next, a main header including information necessary to restore the aggregated data frames is added to the data block, and further a control information field of the data packet is added before the data block having the main header added thereto and a frame check field of the data packet is added thereafter, to generate the data packet.

According to a twelfth aspect of the invention, the main header includes a class field indicating a structure of the main header according to the number of data frames included in the data packet, and a frame number field indicating the number of frames in the data packet.

the main header is formed without the fields except for the class field when the number of data frames in the data packet is one.

A fourteenth aspect of the invention is the procedure for restoring the data packet in the twelfth aspect of the invention. The structure of the class field is checked according to a value of the class field of the main header in each data packet received. Further, the corresponding data frames are cut out sequentially from the data sizes of the subheaders of the data frames for each of the data packets, according to the value of the frame number field of the main header. Thereby, it is possible to restore the data frames included in the received data packet.

A fifteenth aspect of the invention is the procedure for restoring the data packet in the thirteenth aspect of the invention. The structure of the class field is checked according to a value of the class field of the main header in each data packet received. Further, the corresponding data frames are cut out sequentially according to the data size of the subheader of the data frame for each of the data packets. Thereby, it is possible to restore the data frame included in the received data packet.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 13 are views showing the structure of the data packets according to the first frame structure example generated by the first processing procedure;

FIG. 16 is a view explaining the procedure of the restoring processing on the data packets 1 and 2 according to the second frame structure example generated by the first processing procedure;

FIG. 21 is a view explaining the procedure of the restoring processing on the data packets 1 and 2 according to the fourth frame structure example generated by the second processing procedure;

FIG. 24 are views explaining the ways of generating one or plural data packet(s) from plural data frames, in which (1) shows division of the data frame, (2) shows patching the data frames, (3) shows connecting of the data frames, and (4) shows connecting of the data frames.

BEST MODE FOR CARRYING OUT THE INVENTION (First Embodiment of Format Identification Procedure of Data Packet)

Figure 2:
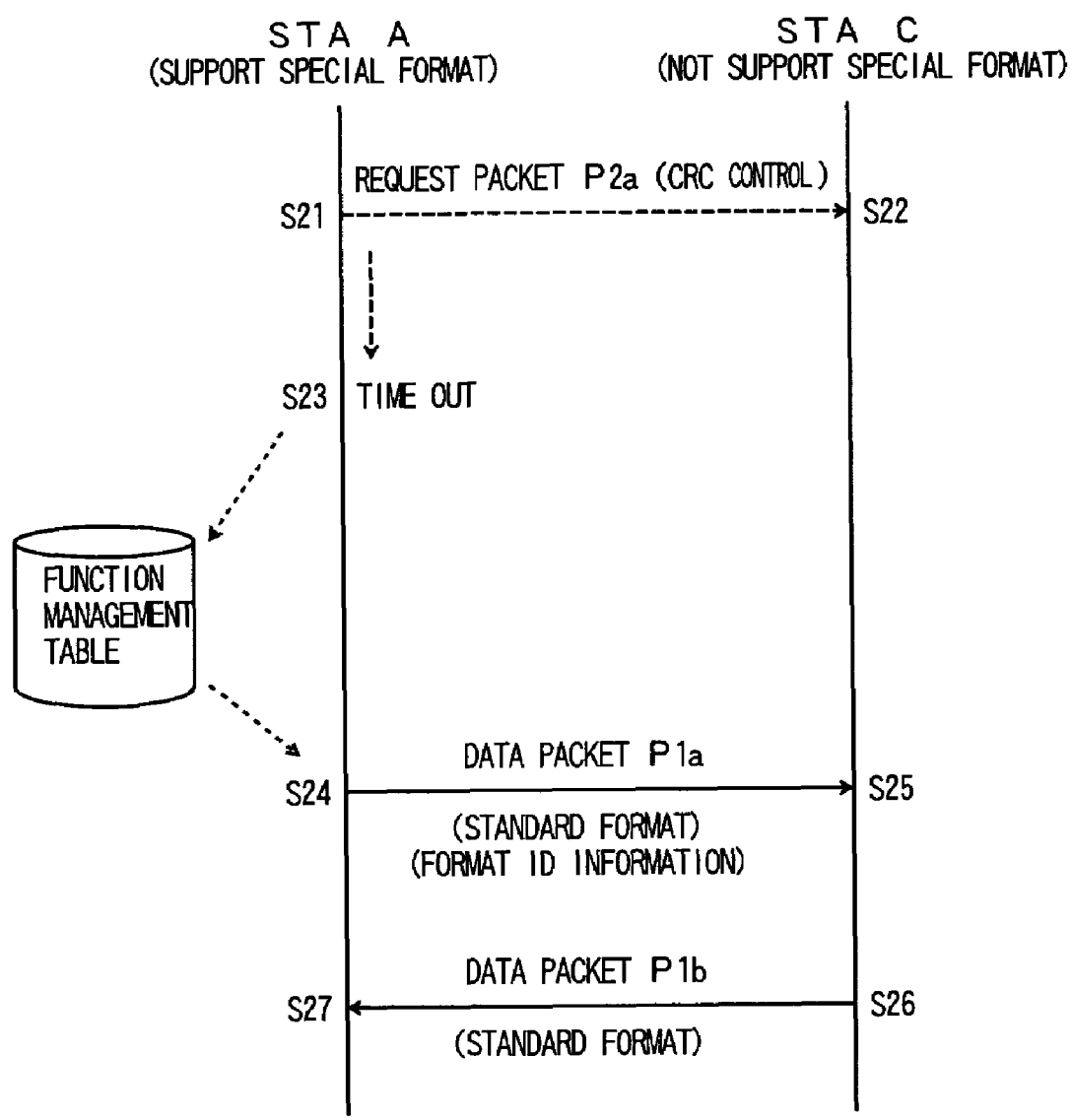
FIG. 2 are views showing the first embodiment of the format identification procedure of the data packets according to the wireless packet communication method of the present invention.
Figure 1:
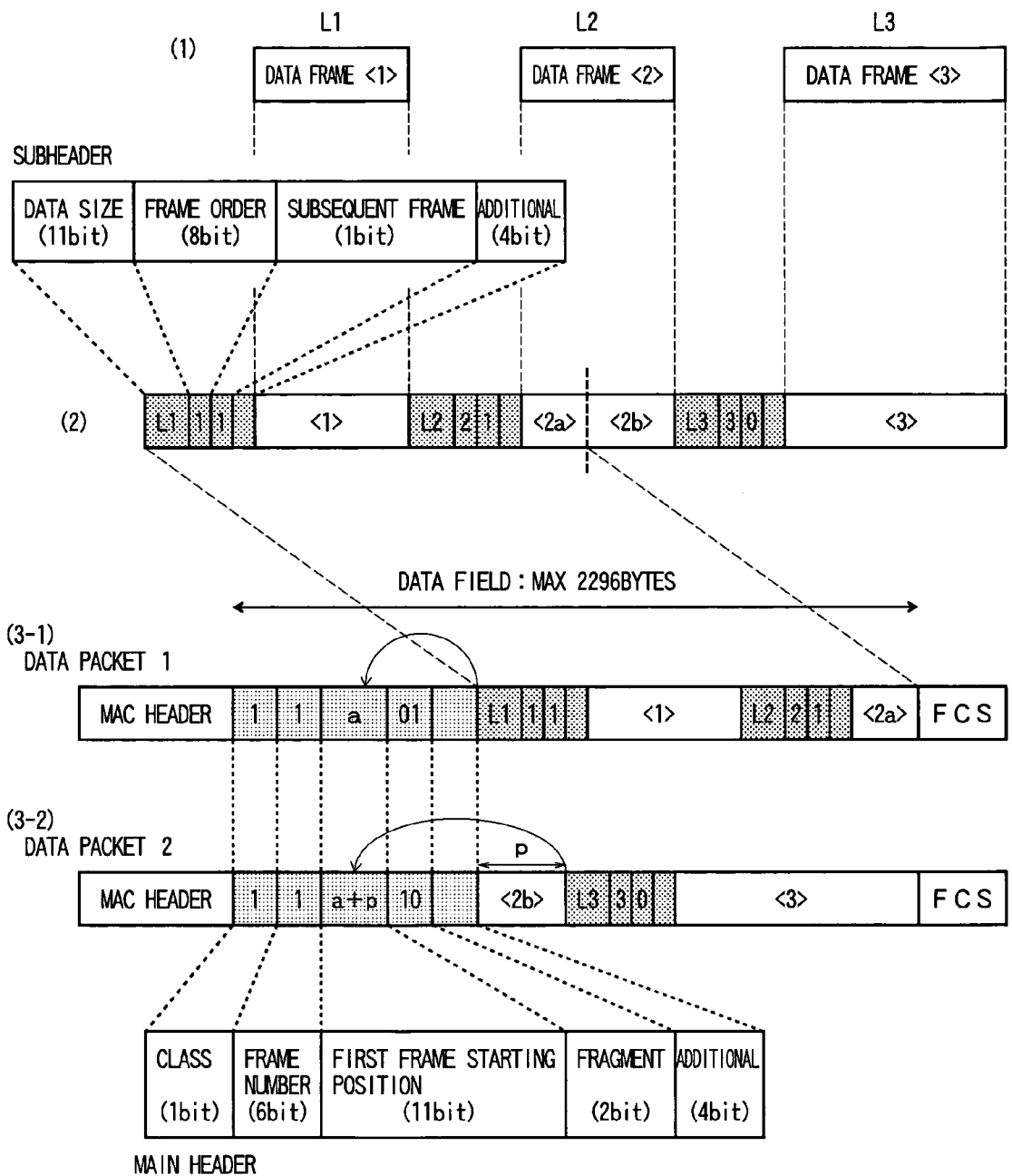
FIG. 1 are views showing a first embodiment of a format identification procedure of data packets according to a wireless packet communication method of the present invention.

FIG. 1 and FIG. 2 show a first embodiment of a format identification procedure of data packets according to a wireless packet communication method of the present invention.

First, the procedure for check whether a special format is supported or not and transmitting/receiving a data packet in the special format between a STA A and a STA B which support the special format will be explained with reference to FIG. 1.

In FIG. 1, the STA A which supports the special format transmits a request packet P2a to the STA B (S11). A CRC code of this request packet P2a is manipulated by at least one processing of bit inversion of all bits of the CRC code which is stored in an FCS field, bit inversion of a part of the bits, and addition or subtraction of a predetermined value to/from the CRC code. Such a request packet whose CRC code is manipulated is received normally only in the STA which supports the special format.

Since the STA B supports the special format, it identifies the request packet P2a and recognizes that the transmit-side STA A supports the special format (S12). Then, information on whether the STA A supports the special format or not is recorded on a function management table in the own station. In the function management table as shown in FIG. 1(2), for example, the information on whether the special format is supported or not is recorded corresponding to IDs (identification codes) of the respective STAs.

The STA B transmits a predetermined reply packet P2b to the transmit-side STA of the received request packet P2a (S13). A CRC code of the reply packet P2b is also manipulated. The STA A identifies the reply packet P2b from the STA B in response to the transmitted request packet P2a, and recognizes that the STA B supports the special format (S14). Then, information on whether the special format is supported or not is recorded on a function management table in the own station.

When the STA A performs transmission to the STA B, it refers to the contents of the function management table in the own station to check whether the receive-side STA supports the special format or not (S15). In this case, since the receive-side STA B supports the special format, the STA A generates a data packet P1a according to the special format and transmits it to the STA B (S15). At this time, in a MAC header (control information field) of the data packet P1a, format identification information indicating the special format is set. In the case of simultaneous transmission, a plurality of data packets having uniform packet time length are generated in the special format.

When the STA B receives the data packet P1a, it recognizes that it is in the special format by the format identification information set in the MAC header, and processes the received data packet P1a according to the definition (defined in advance) of the special format (S16).

Similarly, when the STA B performs the transmission to the STA A, it refers to the contents of the function management table in the own station to check whether the receive-side STA supports the special format or not (S17). In this case, since the receive-side STA A supports the special format, the STA B generates a data packet P1b according to the special format and transmits it to the STA A (S17). At this time, in a MAC header (control information field) of the data packet P1b, format identification information indicating the special format is set. In the case of the simultaneous transmission, a plurality of data packets having the uniform packet time length are generated in the special format.

When the STA A receives the data packet P1b, it recognizes that it is in the special format by the format identification information set in the MAC header, and processes the received data packet P1b according to the definition of the special format (S18).

Next, the procedure for check whether the special format is supported or not and transmitting/receiving the data packet in a standard format between the STA A which supports the special format and a STA C which does not support the special format will be explained with reference to FIG. 2.

In FIG. 2, the STA A which supports the special format transmits a request packet P2a to the STA C (S21). A CRC code of this request packet P2a, which is stored in the FCS field, is manipulated as above. Such a request packet whose CRC code is manipulated is received normally only in the STA which supports the special format.

Since the STA C does not support the special format, an FCS check error of the received request packet P2a is caused (S22). Thereby, the request packet is voided and does not affect subsequent operation of the STA C at all.

In the STA A, a reply packet in response to the transmitted request packet P2a does not arrive for a long time, and therefore a timeout is caused (S23). Thereby, the STA A recognizes that the STA C does not support the special format. Then, it records this information on the function management table in the own station.

When the STA A performs the transmission to the STA C, it refers to the contents of the function management table in the own station to check whether the receive-side STA supports the special format or not (S24). In this case, since the receive-side STA C does not support the special format, the STA A generates a data packet P1a according to the standard format and transmits it to the STA C (S24). At this time, in a MAC header (control information field) of the data packet P1a, format identification information indicating the standard format is set. When the STA C receives the data packet P1a, it recognizes that it is in the standard format by the format identification information set in the MAC header, and processes it according to the definition of the standard format (S25).

Moreover, when the STA C performs the transmission to the STA A, it generates a data packet P1b according to the standard format and transmits it (S26). At this time, in a MAC header (control information field) of the data packet P1b, format identification information indicating the standard format is set. When the STA A receives the data packet P1b, it recognizes that it is in the standard format by the format identification information set in the MAC header, and processes the received data packet P1b according to the definition of the standard format (S27).

Thus, according to this embodiment, the CRC codes of the request packet P2a and the reply packet P2b are manipulated so as to check whether the special format is supported or not between the STAs A and B and the STAs A and C, and they are recorded in the function management tables. For the transmission to the STA which supports the special format, the data packet in the special format is generated and the format identification information indicating the special format is set in its MAC header. Further, for the transmission to the STA which supports the standard format, the data packet in the standard format is generated and the format identification information indicating the standard format is set in its MAC header. At receive side, the format of the received data packet is recognized from the format identification information in the MAC header, and the data packet is subjected to reception processing according to the corresponding format.

Figure 3:
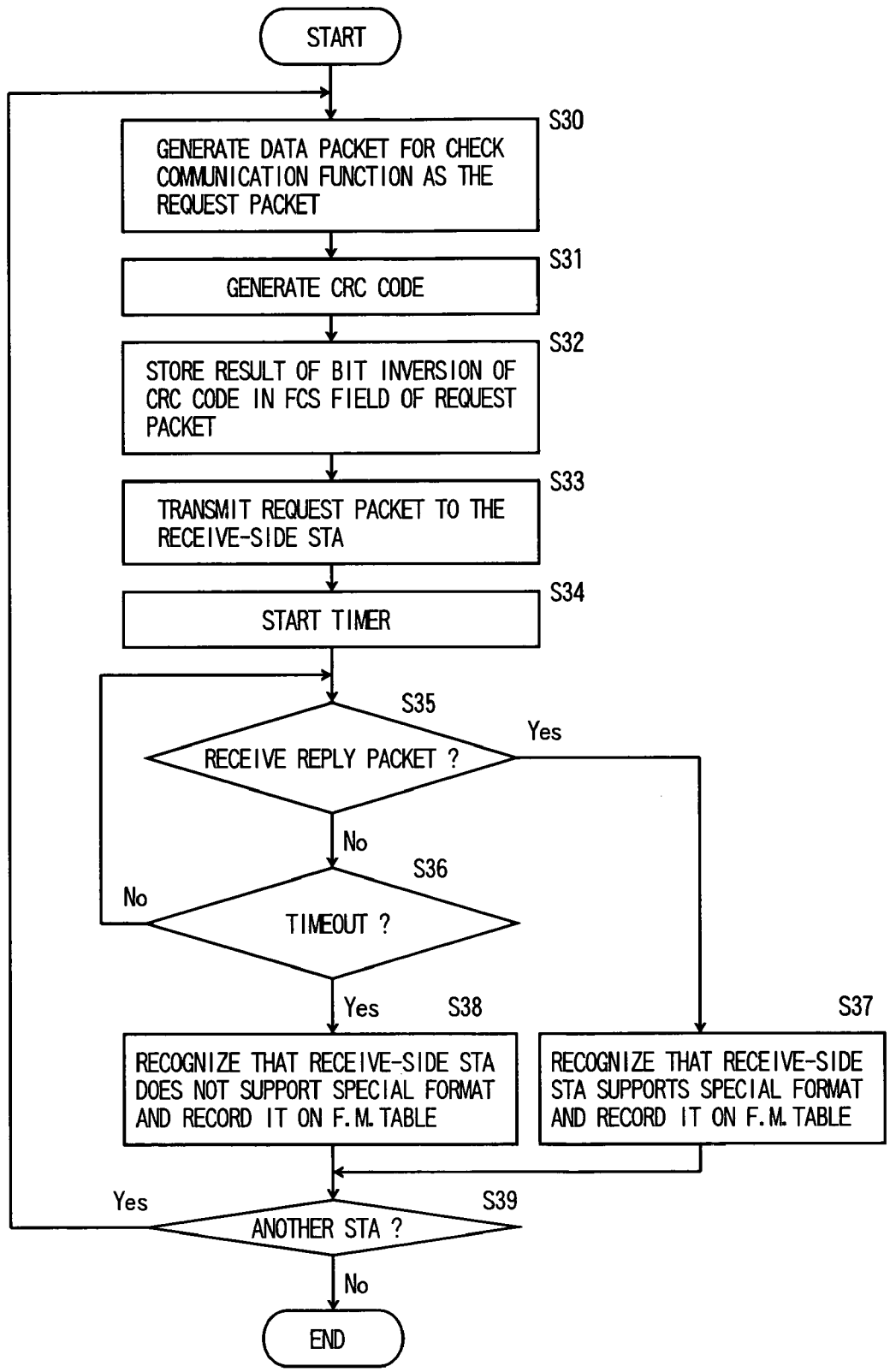
FIG. 3 is a flowchart showing a processing procedure for format identification of the data packet in a STA.

FIG. 3 shows a processing procedure for format identification of the data packet in the STA. In the flowchart, the STA generates the data packet for check communication function as the request packet (S30). Next, it generates the CRC code for error detection of the request packet (S31), performs the bit inversion of all the bits of the CRC code, and stores its result in the FCS field of the request packet (S32). Incidentally, the processing of the bit inversion of a predetermined part of the bits and the addition or subtraction of the predetermined value may be performed instead of the bit inversion of all the bits.

Next, it transmits this request packet to the receive-side STA (S33), and starts an internal timer for check an elapsed time after the transmission of the request packet (S34). Here, it monitors whether it receives the reply packet in response to the transmitted request packet or not before the internal timer times out (S35 and S36), and when it receives the reply packet before the timeout, it recognizes that the receive-side STA supports the special format, and records the information on the function management table in the own station corresponding to the ID of the receive-side STA (S37). Meanwhile, when the time is out before receiving the reply packet, it recognizes that the receive-side STA does not support the special format, and records the information on the function management table in the own station corresponding to the ID of the receive-side STA (S38).

Moreover, when there are other receive-side STAs, it returns to the step S30 from the step S39 and repeats the above operation. Thereby, the information as shown in FIG. 1(2) is recorded on the function management table in each STA. Thus, it is possible for each of the STAs to figure out whether the receive-side STA supports the special format or not from the contents of the function management table.

Figure 4:
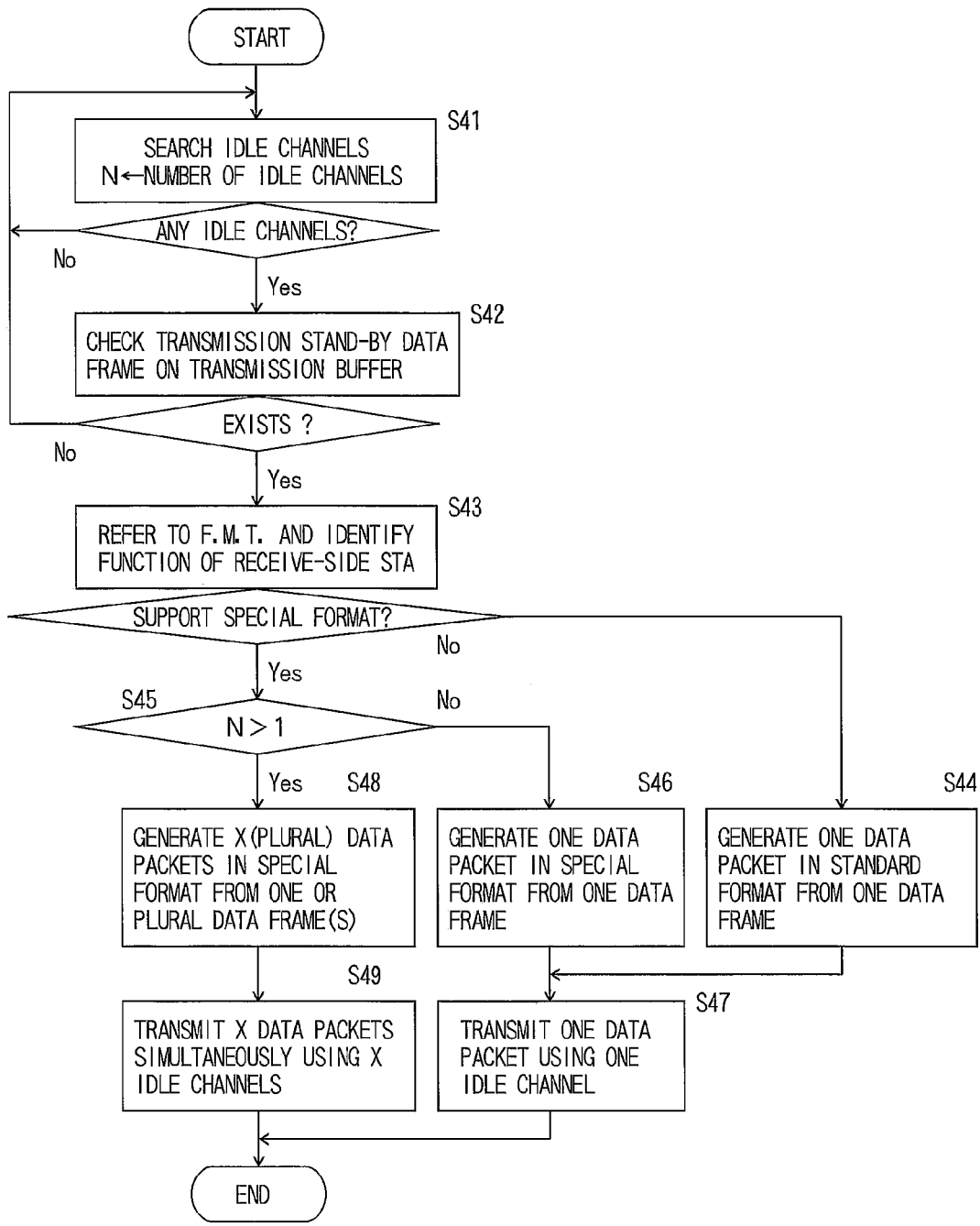
FIG. 4 is a flowchart showing a transmission processing procedure 1 of the data packet in the STA.

FIG. 4 shows a transmission processing procedure 1 of the data packet in the STA. In the flowchart, the STA A which performs transmission processing searches all idle wireless channels out of all available wireless channels (S41). In actuality, it detects availability of the wireless channels by means of carrier sense of each of the channels. The detected total of the idle wireless channels is defined as N. When it detects one or more idle wireless channel(s), it proceeds to the next step S42. Next, it acquires information on the presence/absence of the data frame in a transmission stand-by state on a transmission buffer (S42). When there is a data frame in the stand-by state, it proceeds to the next step S43.

Next, it refers to the contents of the function management table in the own station and identifies whether the receive-side STA supports the special format or not (S43). When it performs the transmission to the STA which does not support the special format, it generates one data packet in the standard format from one data frame, similarly to the general STA (S44). Meanwhile, when it performs the transmission to the STA which supports the special format, it generates the data packets in the special format corresponding to the number of idle wireless channels N. When the number of idle wireless channel N is one, it generates one data packet using one data frame, similarly to the general STA (S45 and S46).

However, the special format is used for the format of the data packet and the format identification information indicating the special format is set in the MAC header. When the number of idle wireless channels N is two or more, it generates X (plural) data packets in the special format using one or plural data frame(s) (S45 and S48). The format identification information indicating the special format is set in the MAC header of this data packet.

When one data packet is generated in the steps S44 and S46, one data packet is transmitted using one idle wireless channel (S47). Meanwhile, when the number of idle wireless channels N is two or more and the X (plural) data packets are generated in the step S48, simultaneous transmission of the X data packets are performed using the X idle wireless channels simultaneously (S49).

Figure 5:
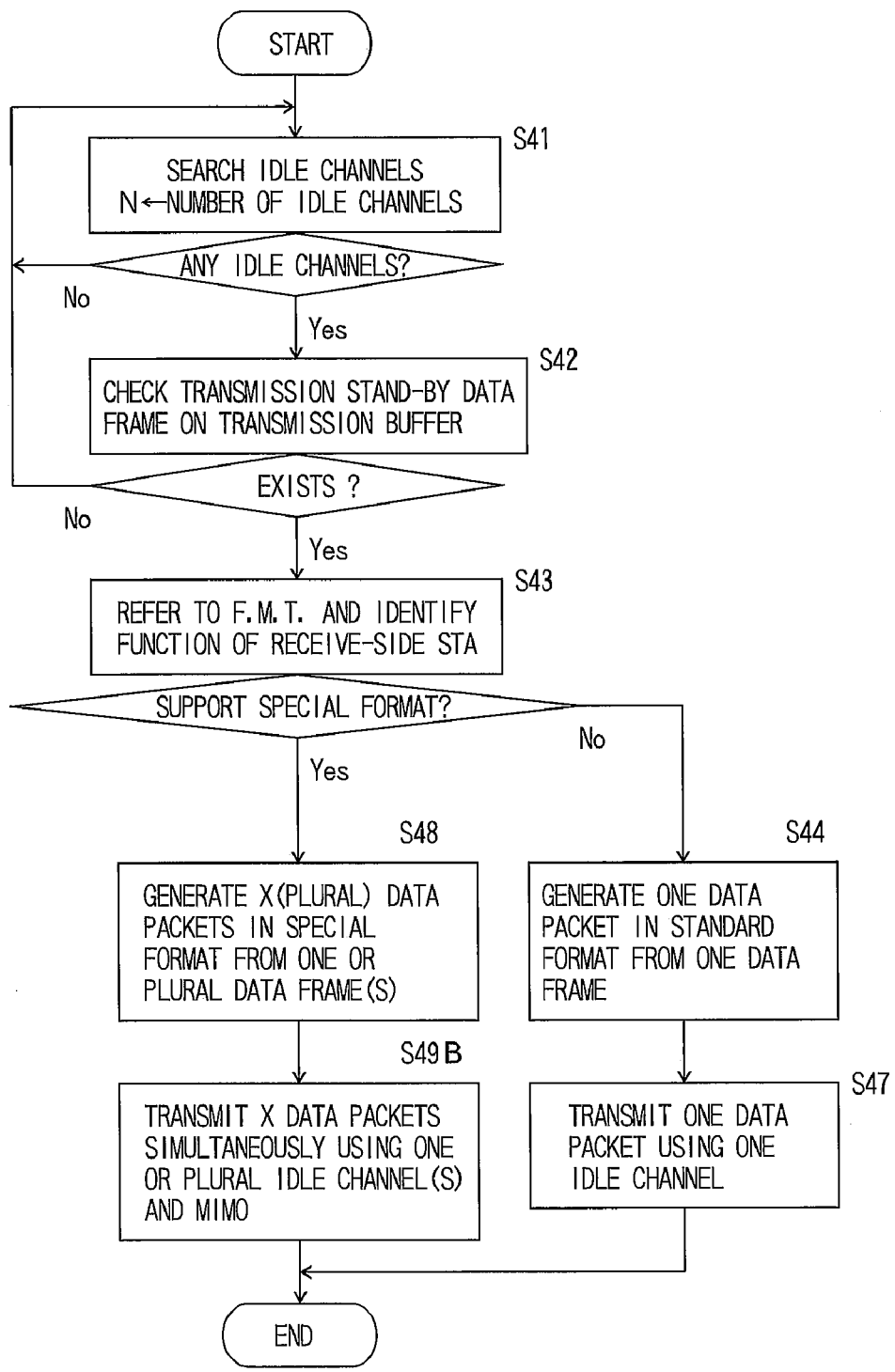
FIG. 5 is a flowchart showing a transmission processing procedure 2 of the data packet in the STA.

FIG. 5 shows a transmission processing procedure 2 of the data packet in the STA. Here, the case where MIMO is used together is shown and, when the total number of MIMOs of the respective idle wireless channels is L, the number of data packets to be transmitted simultaneously X is decided within the range of (X<=L).

Since the plural data packets can be transmitted simultaneously through one wireless channel by the MIMO, processing corresponding to the steps S45 and S46 in FIG. 4 are omitted here. Therefore, when the receive-side STA supports the special format, it proceeds from the step S43 to S48 to generate the X data packets. Next, one or the plural idle wireless channel(s) and the MIMO are used together to perform the simultaneous transmission of the X data packets (S49B). The rest of the operation is the same as the transmission processing procedure 1 shown in FIG. 4.

Although this transmission processing procedure 2 assumes that the MIMO is used together when the multiple wireless channels can be used simultaneously, it is also possible to perform the simultaneous transmission of the plural data packets simultaneously using the MIMO even when only one wireless channel is available.

Figure 6:
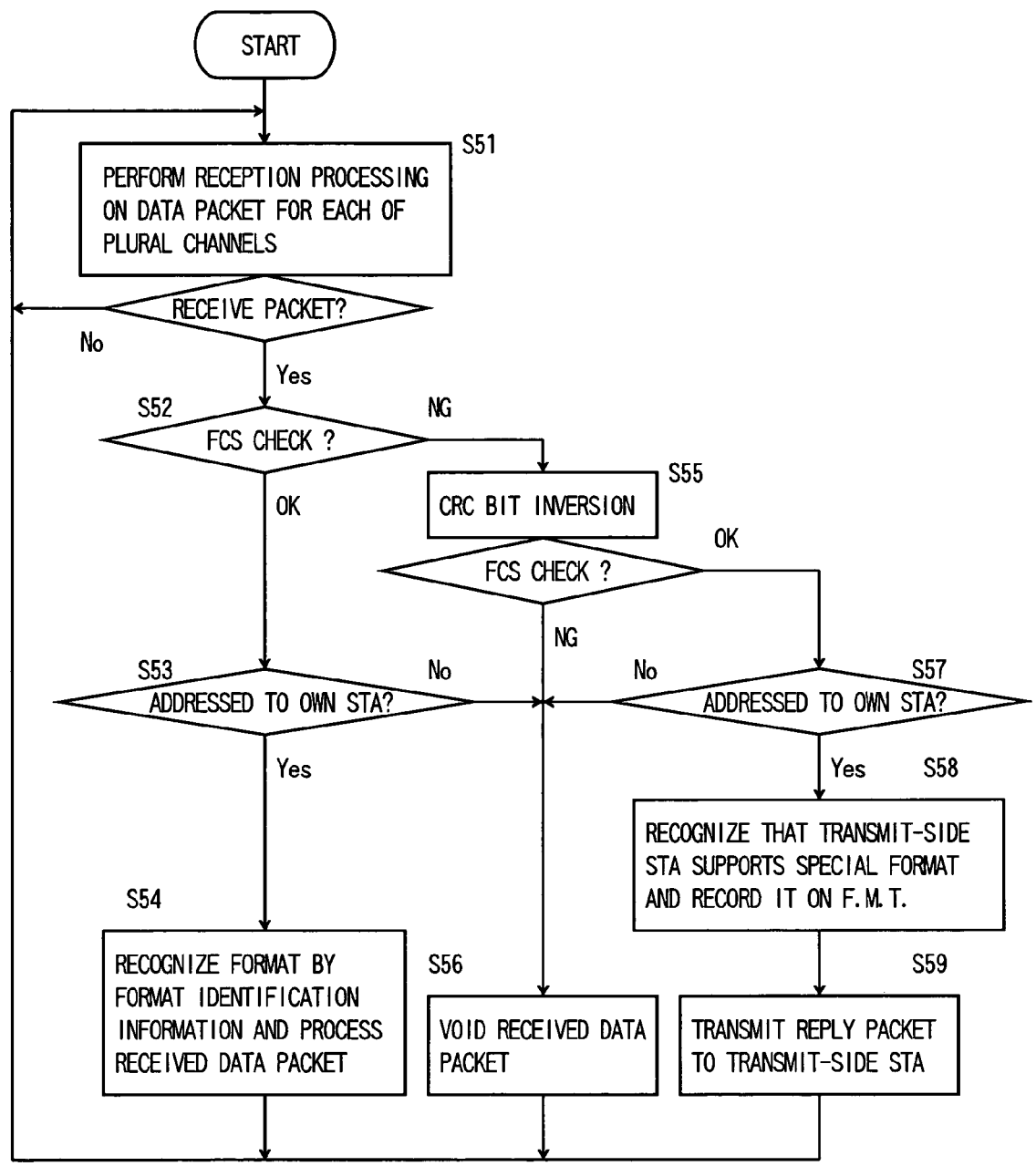
FIG. 6 is a flowchart showing a reception processing procedure of the data packet in the STA.

FIG. 6 shows a reception processing procedure of the data packet in the STA. In the flowchart, the STA which performs the reception processing performs the reception processing on the data packet repeatedly for each of the multiple wireless channels (S51). Here, when it receives the data packet, it performs an FCS check on the received data packet (S52). That is, it checks whether the result of the predetermined CRC arithmetic on the data packet agrees with the CRC code stored in the FCS field or not.

The result of the CRC arithmetic agrees with the CRC code when the data packet in the standard format or in the special format is received normally, but disagreement is caused when a bit error or the like is occurring in the contents of the data packet. Further, when the request packet is transmitted, the bit inversion of the CRC code is performed by the transmit-side STA in the step S32 in FIG. 3, and hence the disagreement is caused at all times.

Therefore, when the agreement of the CRC code is detected, it checks whether the address of the received data packet agrees with the ID of the own station or not (S53) and, when it is addressed to the own station, recognizes the frame format by the format identification information obtained from the MAC header of the received data packet, and processes the received data packet (S54). Further, when it is not addressed to the own station, it voids the received data packet (S56).

Moreover, when it detects the disagreement of the CRC code, it performs the arithmetic on the CRC code reverse to the arithmetic performed by the transmit-side STA in the step S32 in FIG. 3. In this case, it inverses all the bits of the CRC code to restore the original CRC code, and checks whether its result agrees with the result of the CRC arithmetic of the data packet or not (S55). When the bit error of the data is occurring in the received data packet, it voids the received data packet because the disagreement is detected even when the bit inversion of the CRC code is performed (S56).

Meanwhile, when it receives the request packet, the result of the bit inversion agrees therewith, and it checks whether the address of the received request packet agrees with the ID of the own station or not (S57). When it receives the request packet addressed to the own station, it recognizes that the transmit-side STA supports the special format, and records the information on the function management table in the own station corresponding to the ID of the transmit-side STA (S58). Further, it transmits the predetermined reply packet to the transmit-side STA A (S59). Meanwhile, it voids the request packet when it is not addressed to the own station (S56).

Incidentally, when the STA which does not support the special format and performs the conventional operation receives the request packet, it processes it simply as the FCS check error and voids the packet, and therefore no problems are caused. That is, no problems are caused even in the system in which the STA supporting the special format and the STA not supporting the special format are mixed.

(Second Embodiment of Format Identification Procedure of Data Packet)

Figure 7:
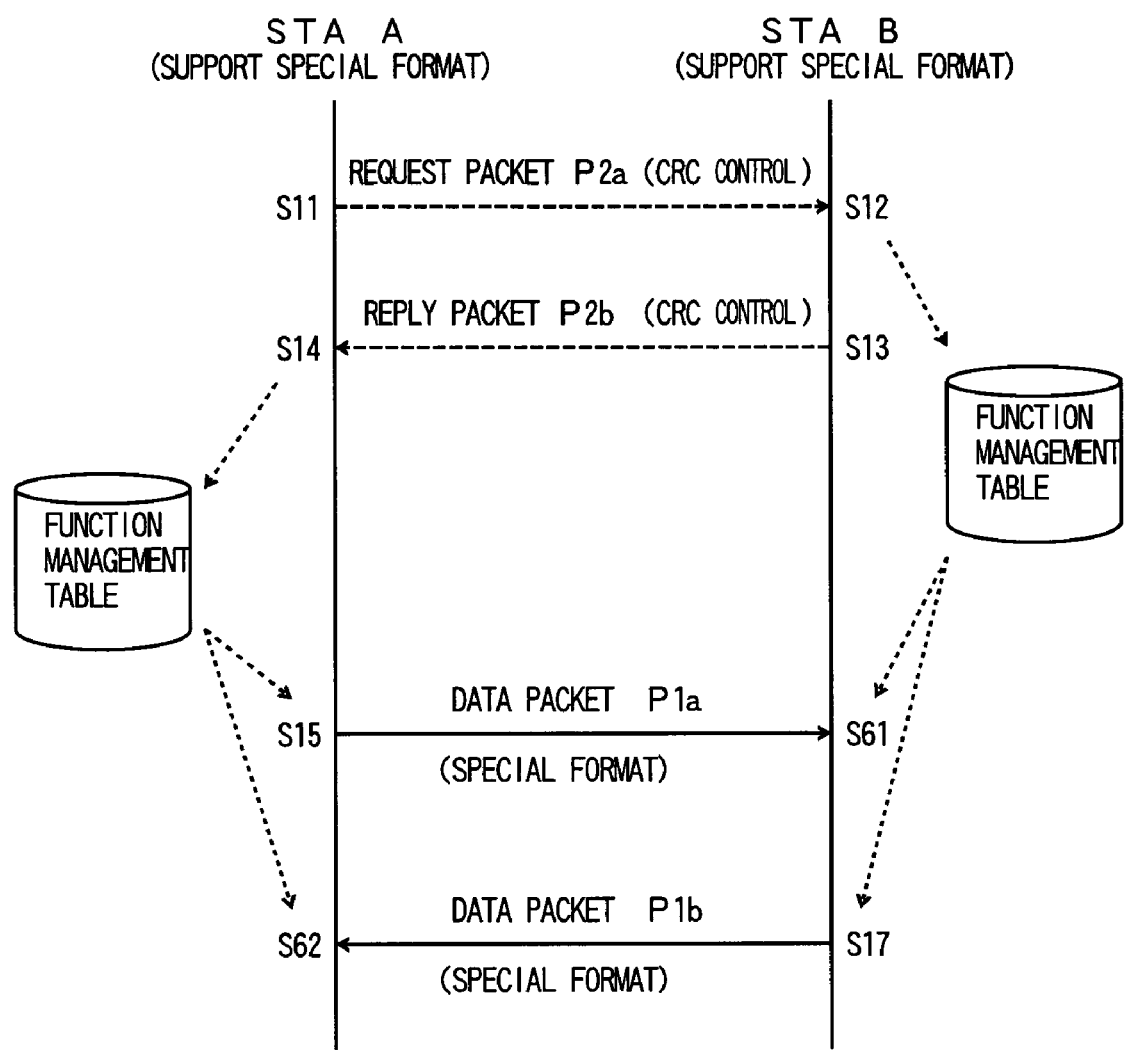
FIG. 7 is a view showing a second embodiment of a format identification procedure of data packets according to the wireless packet communication method of the present invention.
Figure 8:
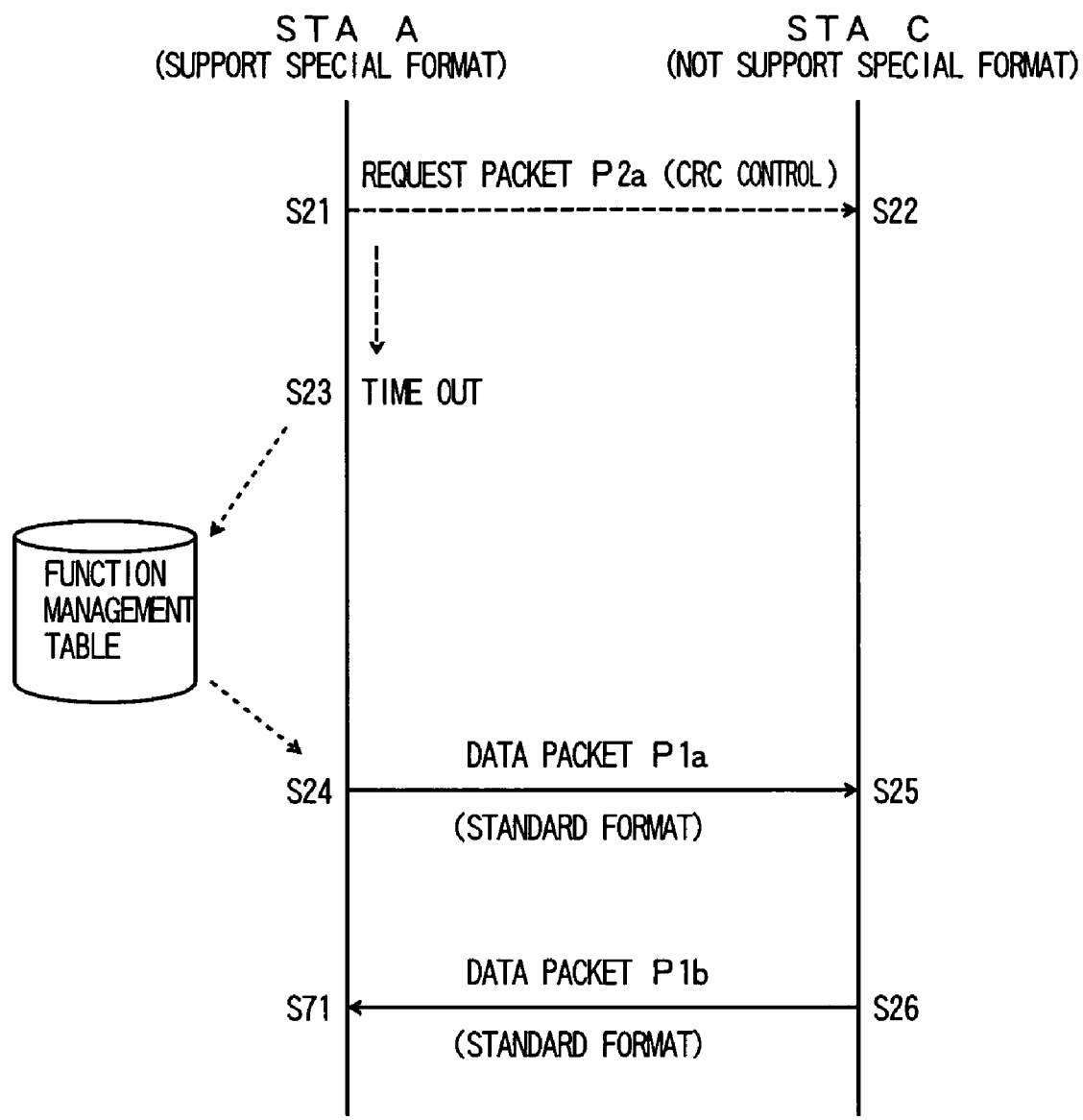
FIG. 8 is a view showing the second embodiment of the format identification procedure of the data packets according to the wireless packet communication method of the present invention.

FIG. 7 and FIG. 8 show a second embodiment of a format identification procedure of data packets according to the wireless packet communication method of the present invention.

First, the procedure for check whether a special format is supported or not and transmitting/receiving the data packets in the special format between a STA A and a STA B which support the special format will be explained with reference to FIG. 7. Incidentally, the procedure (S11 to S14) in which the STA A and the STA B recognize that the both are the STAs supporting the special format by exchanging a request packet P2a and a reply packet P2b and record the information on function management tables in own stations is the same as the processing shown in FIG. 1. It should be noted that CRC codes of the request packet P2a and the reply packet P2b are manipulated, and these can be received normally only in the STA supporting the special format.

When the STA A performs the transmission to the STA B, it refers to the contents of the function management table in the own station and checks whether the receive-side STA supports the special format or not (S15). In this case, since the receive-side STA B supports the special format, the STA A generates a data packet P1a according to the special format and transmits it to the STA B (S15). Incidentally, in the case of simultaneous transmission, a plurality of data packets having uniform packet time length are generated.

When the STA B receives the data packet P1a, it identifies the transmit-side STA from its MAC header, refers to the contents of the function management table in the own station, and checks whether the transmit-side STA supports the special format or not. In this case, since the transmit-side STA A supports the special format, the STA B processes the received data packet P1a according to a definition (defined in advance) of the special format (S61).

Similarly, when the STA B performs the transmission to the STA A, it refers to the contents of the function management table in the own station and checks whether the receive-side STA supports the special format or not (S17). In this case, since the STA A of the receive-side STA supports the special format, the STA B generates a data packet P1b according to the special format and transmits it to the STA A (S17). Incidentally, in the case of the simultaneous transmission, a plurality of data packets having the uniform packet time length are generated.

When the STA A receives the data packet P1b, it identifies the transmit-side STA from its MAC header, refers to the contents of the function management table in the own station, and checks whether the transmit-side STA supports the special format or not. In this case, since the transmit-side STA B supports the special format, the STA A processes the received data packet P1b according to the definition (defined in advance) of the special format (S62).

Next, the procedure for check whether the special format is supported or not and transmitting/receiving the data packets in a standard format between the STA A which supports the special format and a STA C which does not support the special format will be explained with reference to FIG. 8. Incidentally, the procedure (S21 to S23) in which the STA A transmits the request packet P2a to the STA C, recognizes that the STA C is the STA supporting the standard format, and records the information on the function management table in the own station is the same as the processing shown in FIG. 2.

When the STA A performs the transmission to the STA C, it refers to the contents of the function management table in the own station and checks whether the receive-side STA supports the special format or not (S24). In this case, since the receive-side STA C does not support the special format, the STA A generates a data packet P1a according to the standard format and transmits it to the STA C (S24). When the STA C receives the data packet P1a, it processes it according to the definition of the standard format (S25).

Moreover, when the STA C performs the transmission to the STA A, it generates a data packet P1b according to the standard format and transmits it (S26). When the STA A receives the data packet P1b, it identifies the transmit-side STA from its MAC header, refers to the contents of the function management table in the own station, and checks whether the transmit-side STA supports the special format or not. In this case, since the transmit-side STA C does not support the special format, the STA A processes the received data packet P1b according to the definition of the standard format (S71).

According to the first embodiment of the format identification procedure of the data packet, the format identification information is set in the MAC header of the transmitting data packet and receive-side STA performs the reception processing in the format corresponding to the format identification information. Meanwhile, according to this embodiment, instead of setting the format identification information in the MAC header, the transmit-side STA is identified from the MAC header and the format of the received data packet is identified by referring to the function management table.

Further, the CRC code of the data packet may be manipulated and stored in the FCS field when it is in the special format, and receive-side STA may identify the manipulated CRC code to recognize that it is in the special format, similarly to the request packet and the reply packet.

(Frame Structure of Data Packet in Special Format)

Figure 9:
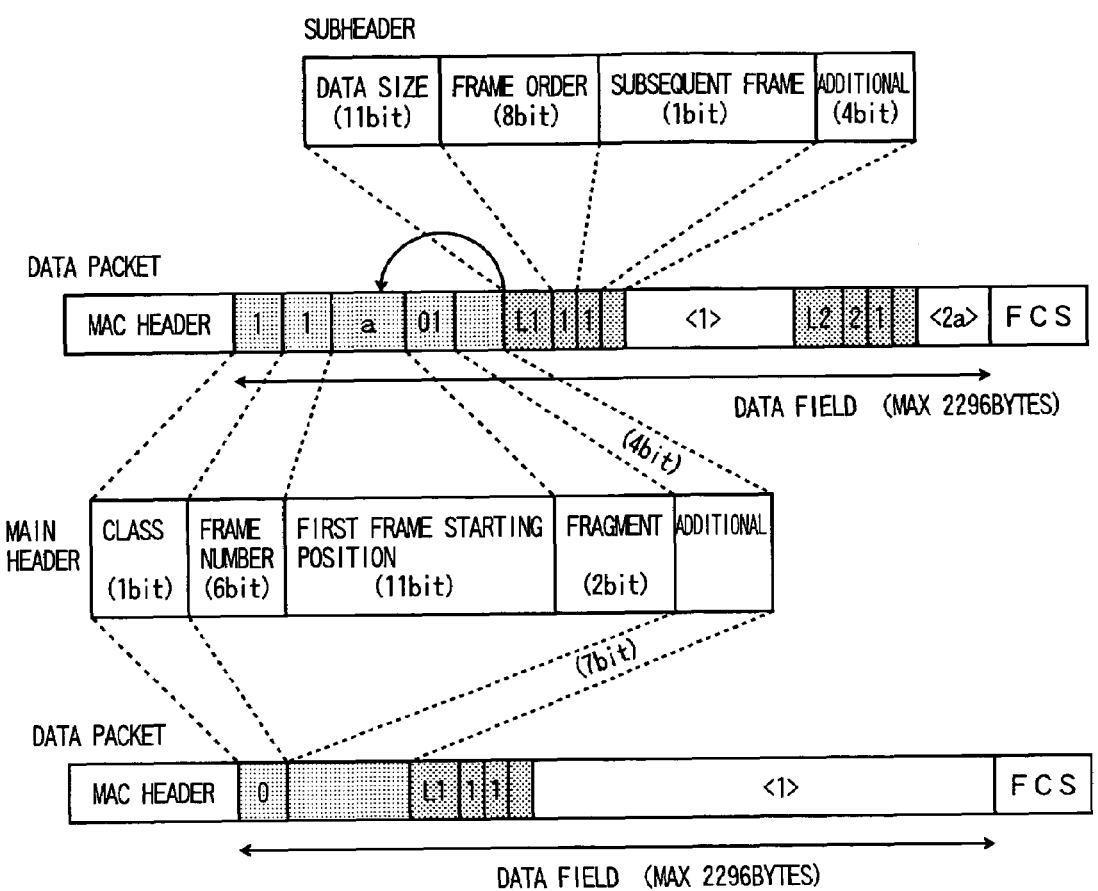
FIG. 9 is a view showing a first frame structure example of the data packets in a special format.

FIG. 9 shows a first frame structure example of the data packets in the special format. In this case, the frame structure of the data packets which are generated by "patching" the data frames, as shown in FIG. 24(2), is shown. Incidentally, when the data frame is divided by patching, each of the divided data frames is referred to as a fragment.

The data packet is constituted of the MAC header (control information field), a data field of 2296 bytes at the maximum, and the FCS (Frame Check Sequence) field. The data packet in the special format has a main header, data sections constituted of the respective data frames which are patched, and subheaders added to the respective data sections, which are arranged in the data field.

The main header is constituted of a class field (1 bit) indicating the structure of the main header according to the number of data frames and fragments included in the data packet, a frame number field (6 bits) indicating the number of frames in the data packet, a first frame starting position field (11 bits) indicating the frame starting position in the data packet in unit of byte, a fragment field (2 bits) indicating the presence/absence and the position of the fragment, and an additional field (4 bits). It should be noted that, when the number of data frames and fragments included in the data packet is plural, the class field becomes "1". Further, when the number of data frame and fragment included in the data packet is 1, the class field becomes "0", and the main header is constituted of the class field (1 bit) and the additional field (7 bits). The bit numbers of the respective fields constituting the main header are an example, and the additional field is to adjust the main header to be in the unit of byte, which is not indispensable. The fragment field becomes "00" when there is no fragment, "10" when it is at the head, "01" when it is at the end, and "11" when it is at the head and the end.

The subheader is constituted of a data size field (11 bits) indicating the data size of each data frame, a frame order field (8 bits) indicating the order of each data frame to be connected, a subsequent frame field (1 bit) indicating the presence/absence of the subsequent frame, and an additional field (4 bits). Incidentally, the bit numbers of the respective fields constituting the subheader are an example, and the additional field is to adjust the subheader to be in the unit of byte, which is not indispensable. The subsequent frame field becomes "1" when the subsequent frame is present, and "0" when the subsequent frame is present, that is, when the data frame is at the end.

Figure 10:
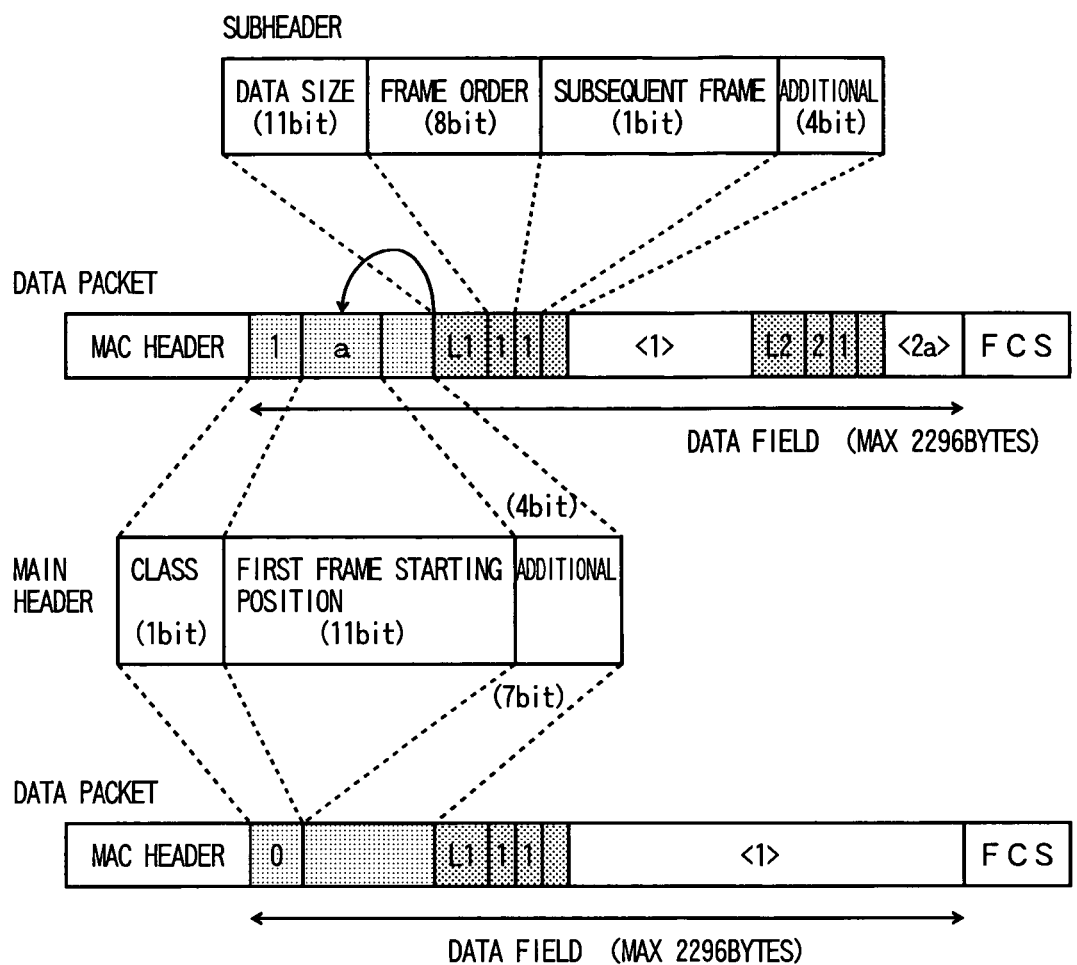
FIG. 10 is a view showing a second frame structure example of the data packets in the special format.

FIG. 10 shows a second frame structure example of the data packets in the special format. In this case, the frame structure of the data packets which are generated by patching the data frames, as shown in FIG. 24(2), is shown. Incidentally, the second frame structure example simplifies the structure of the main header of the first frame structure example.

The main header is constituted of the class field (1 bit) indicating the structure of the main header according to the number of data frames and fragments included in the data packet, the first frame starting position field (11 bits) indicating the frame starting position in the data packet in the unit of byte, and the additional field (4 bits). It should be noted that, when the number of data frames and fragments included in the data packet is plural, the class field becomes "1". Further, when the number of data frame and fragment included in the data packet is 1, the class field becomes "0", and the main header is constituted of the class field (1 bit) and the additional field (7 bits). The bit numbers of the respective fields constituting the main header are an example, and the additional field is to adjust the main header to be in the unit of byte, which is not indispensable.

The structure of the subheader is the same as that of the first frame structure example. Incidentally, according to this frame structure example, it is possible to identify the section subsequent to the subheader as either the frame or the fragment by utilizing information on the frame size in the subheader. Accordingly, the fragment field can be omitted from the main header of the first frame structure example. Further, the frame number field indicates the number of data frames which can be extracted from the single data packet, and this number can be used to trigger data frame extraction processing for each data packet to complete. However, when the data frames are extracted from the head of the data packet in order and a judgment is made that the rest is constituted of the fragments, this judgment can be the trigger for completion of the data frame extraction processing. Thereby, the frame number field can be omitted from the main header of the first frame structure example.

Figure 11:
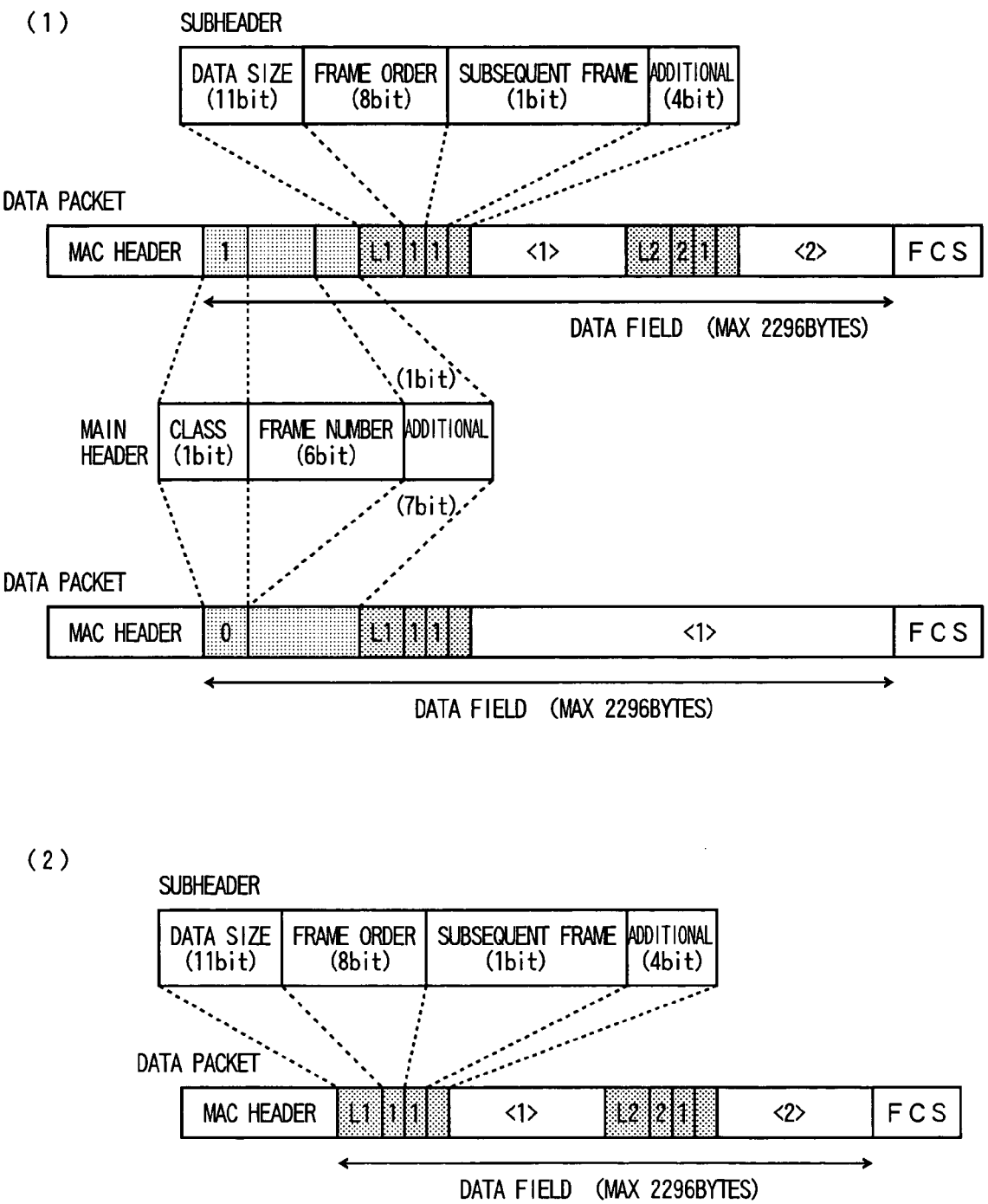
FIG. 11 are views showing frame structure examples of the data packets in the special format, in which (1) shows a third frame structure example and (2) shows a fourth frame structure example.

FIG. 11 show third and forth frame structure examples of the data packets in the special format. In this case, the frame structure of the data packets which are generated by "aggregating" of the data frames, as shown in FIGS. 24(3) and (4), is shown.

The third frame structure example will be explained with reference to FIG. 11(1). The data packet is constituted of the MAC header (control information field), the data field of 2296 bytes at the maximum, and the FCS field. The data packet in the special format has the main header, the data sections constituted of the respective data frames which are aggregated, and the subheaders added to the respective data sections, which are arranged in the data field. The structure of the subheader is the same as that of the first frame structure example.

The main header is constituted of the class field (1 bit) indicating the structure of the main header according to the number of data frames included in the data packet, the frame number field (11 bits) indicating the number of frames in the data packet, and the additional field (4 bits). It should be noted that, when the number of data frames included in the data packet is plural, the class field becomes "1". Further, when the number of data frame included in the data packet is 1, the class field becomes "0", and the main header is constituted of the class field (1 bit) and the additional field (7 bits). The bit numbers of the respective fields constituting the main header are an example, and the additional field is to adjust the main header to be in the unit of byte, which is not indispensable.

Further, the frame number field can be omitted as explained in the second frame structure example. In this case, the main header is constituted of only the class field and the additional field, and there is no difference in the structure of the main header according to the number of data frames included in the data packet, which is the function of the class field.

Accordingly, as the fourth frame structure example shown in FIG. 11(2), the main header itself can be omitted. The structure of the subheader is the same as that of the first frame structure example.

According to the third and fourth frame structure examples, the fragment is not present, all is in frame units, and the values of the frame starting positions are common among all the data packets, contrary to the first and second frame structure examples. Therefore, the first frame starting position field as well as the fragment field become unnecessary.

(Generating/Restoring Processing on Special Format: First Processing Procedure)

Figure 12:
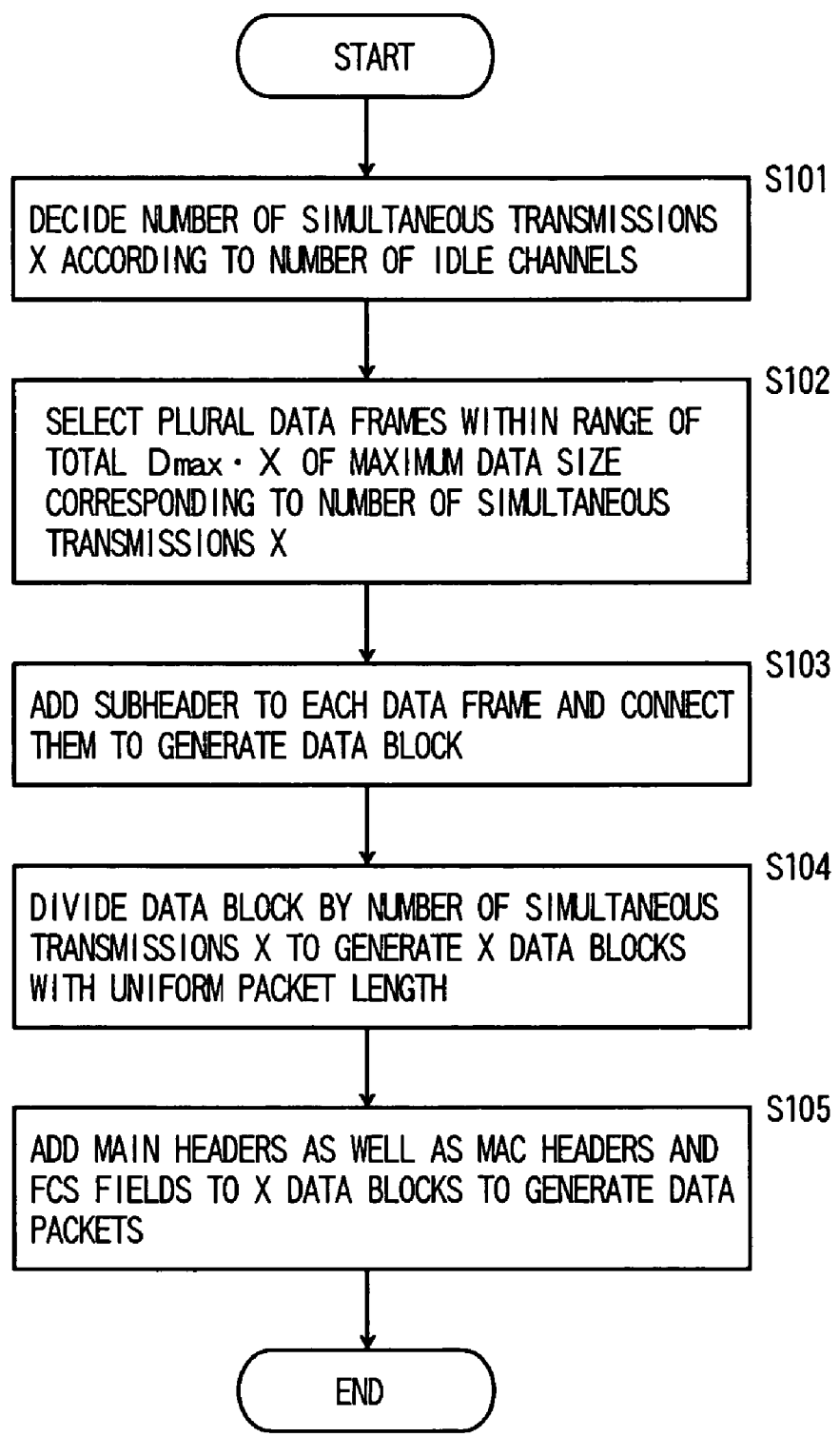
FIG. 12 is a flowchart showing a first processing procedure for generating the data packets in the special format.

FIG. 12 shows a first processing procedure for generating the data packets in the special format. FIG. 13 show the structure of the data packets according to the first frame structure example generated by the first processing procedure. In this case, it is supposed that the number of simultaneous transmissions is two and the two data packets which have the uniform packet time length are generated by patching the three data frames as shown in FIG. 24(2).

In FIG. 12 and FIG. 13, the number of simultaneous transmissions X is decided according to the number of idle channels in the first step S101. Incidentally, when the MIMO is used together, the number of simultaneous transmissions X becomes the total number of MIMOs of the respective wireless channels. In this case, it is supposed that transmission rates of respective transmission mediums to be used in the simultaneous transmission are the same.

In the next step S102, supposing that the maximum data size of the data packet to be transmitted is Dmax, the total of the maximum data sizes corresponding to the number of simultaneous transmissions X is determined by Dmax x X, and a plurality of data frames are selected so that the total data size comes within its range. In this case, supposing that X=2 and Dmax=2296 bytes, the plural (three) data frames, whose total data size including the later-described main headers and subheaders becomes equal to or lower than (2296×2) bytes, are selected. It is supposed that the data sizes of the respective data frames 1, 2 and 3 selected are L1, L2, and L3 (bytes), respectively.

In the next step S103, the subheaders are respectively added to the respective data frames, which are connected to generate the data block. The structure of the subheader (3 bytes) is as shown in FIG. 9. The subsequent frame field in the data frames 1 and 2, for example, becomes "1" because the subsequent frame is present, and "0" in the data frame 3 because the subsequent frame is not present. Since the subheader is 3 bytes, the size of the data block in which these three data frames are connected becomes as follows.

$$(3+L1)+(3+L2)+(3+L3)<=2296\times 2 \text{ (bytes)}$$

In the next step S104, the data block generated in the step S103 is divided by the number of simultaneous transmissions X, and the X data blocks having the uniform packet time length are generated. In this case, the first data block is constituted of the data frame 1, its subheader, a part of the data frame 2 (2a) and its subheader. The second data block is constituted of a part of the rest of the data frame 2 (2b), the data frame 3 and its subheader. Incidentally, although the dividing position in this case is in the data section of the data frame 2, it may be divided in the subheader. Whichever the case may be, the divided data frames are treated as the fragments. That is, the first data block is the connection of the data frame 1 and the fragment, and the second data block is the connection of the fragment and the data frame 3.

Further, when the transmission rates of the transmission mediums used for the simultaneous transmission are different, the maximum data size for each transmission medium is decided by Dmax×Ri/Rmax, where the transmission rate of each transmission medium is Ri (i is an integer from 1 to X) and its maximum rate is Rmax, and the total of the maximum data sizes is determined by (Dmax×Σ (Ri/Rmax), in the case where the simultaneous transmission is performed using the X transmission mediums. Within this range, the subheaders are added to the data sections of the plural data frames, these are connected, and the connected data block is divided by X with size ratio corresponding to the transmission rate Ri, so that the X data blocks with the uniform packet time length (transmission time) are generated.

In the next step S105, the main headers are respectively added to the X data blocks, the MAC headers (control information field of the data packet) are further added to their heads, and the FCS fields are added to their ends, to generate the data packets. The structure of the main header (3 bytes or 1 byte) is as shown in the first frame structure example in FIG. 9.

It is supposed that the first frame starting position field of the data packet 1 is "a" indicating the starting position of the subheader of the data frame 1 with reference to the starting position of the main header of the data packet 1. That is, a corresponds to the length of the main header. The first frame starting position field of the data packet 2 becomes "a+p" which is the length a of the main header added with the length p of the fragment (2b), with reference to the starting position of the main header of the data frame 2. The fragment field of the data frame 1 becomes "01" because the fragment (2a) is at its end, and the fragment field of the data frame 2 becomes "10" because the fragment (2b) is at its head.

Figure 14:
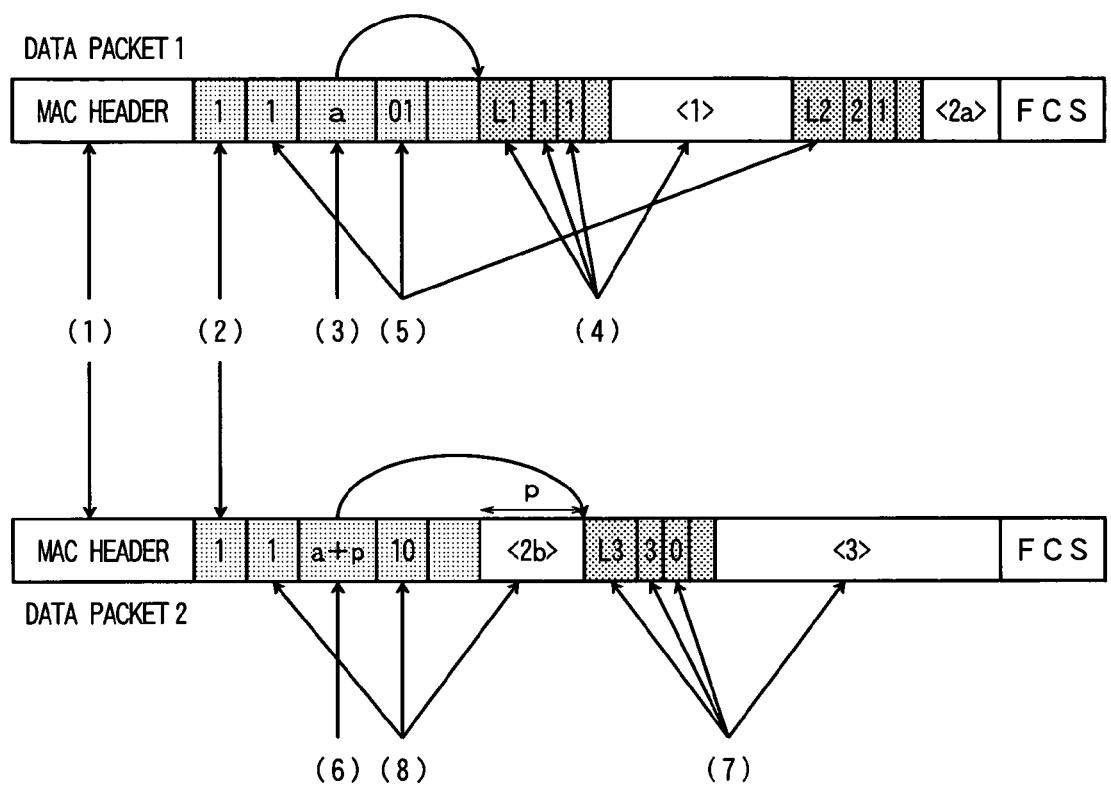
FIG. 14 is a view explaining the procedure of restoring processing on data packets 1 and 2 according to the first frame structure example generated by the first processing procedure.

Next, the procedure of the restoring processing on the data packets 1 and 2 will be explained with reference to FIG. 14.

(1) The received plural data packets are rearranged according to the values indicating the order of the data packets included in the MAC headers of the respective data packets received. In this case, the data packets are rearranged in the order of 1 and 2 and the following processing is performed.

(2) According to the values of the class fields in the main headers of the data packets 1 and 2, the structure of the main headers according to the number of data frames and fragments included in the data packets 1 and 2 is checked. In this case, it is confirmed that the frame number field, the first frame starting position field, and the fragment field are included in the main headers of both of the data packets 1 and 2.

(3) The starting position (a) of the subheader of the first frame is recognized according to the value of the first frame starting position field in the main header of the data packet 1.

(4) According to the data size (L1) and the frame order (1) of the subheader at the first frame starting position of the data packet 1, the data section of the corresponding data frame 1 is cut. At this time, the frame order and the presence/absence of the subsequent frame of the data frame 1 are managed correspondingly.

(5) According to the values of the frame number field and the fragment field in the main header of the data packet 1, the subsequent processing is recognized. In this case, since the frame number is "1" and the fragment information is "01" in the data packet 1, it is recognized that there is no data frame other than the data frame 1 and the fragment comes after the data frame 1. Then, the fragment in the data packet 1 is temporarily stored for connecting processing with the fragment at the head of the data packet 2.

(6) According to the value of the first frame starting position field in the main header of the data packet 2, the starting position (a+p) of the subheader of the data frame 3 in the data packet 2 is recognized.

(7) According to the data size (L3) and the frame order (3) of the subheader at the first frame starting position of the data packet 2, the data section of the corresponding data frame 3 is cut. At this time, the frame order and the presence/absence of the subsequent frame of the data frame 3 are managed correspondingly.

(8) According to the values of the frame number field and the fragment field in the main header of the data packet 2, the subsequent processing is recognized. In this case, since the frame number is "1" and the fragment information is "10" in the data packet 2, it is recognized that there is no data frame other than the data frame 3 and the fragment comes before the data frame 3, and the connecting processing on the fragments is started. In the connecting processing on the fragments, the fragment at the end of the data packet 1 (the subheader and a part of the data section (2a) of the data frame 2) and the fragment at the head of the data packet 2 (a part of the data section (2b) of the data frame 2) are connected. Then, according to the data size (L2) and the frame order (2) of the subheader, the data section of the corresponding data frame 2 is cut. At this time, the frame order and the presence/absence of the subsequent frame of the data frame 2 are managed correspondingly.

By thus utilizing the information of the main headers and the subheaders of the respective data packets, it is possible to restore from the received two data packets 1 and 2 the three data frames 1, 2 and 3 which are patched on the transmit side. Incidentally, since the subsequent frame field of the subheader of the data frame 3 is "0" and the data frames 1, 2 and 3 are restored, it is confirmed that all the data packets 1 and 2 which are transmitted simultaneously are received.

Figure 15:
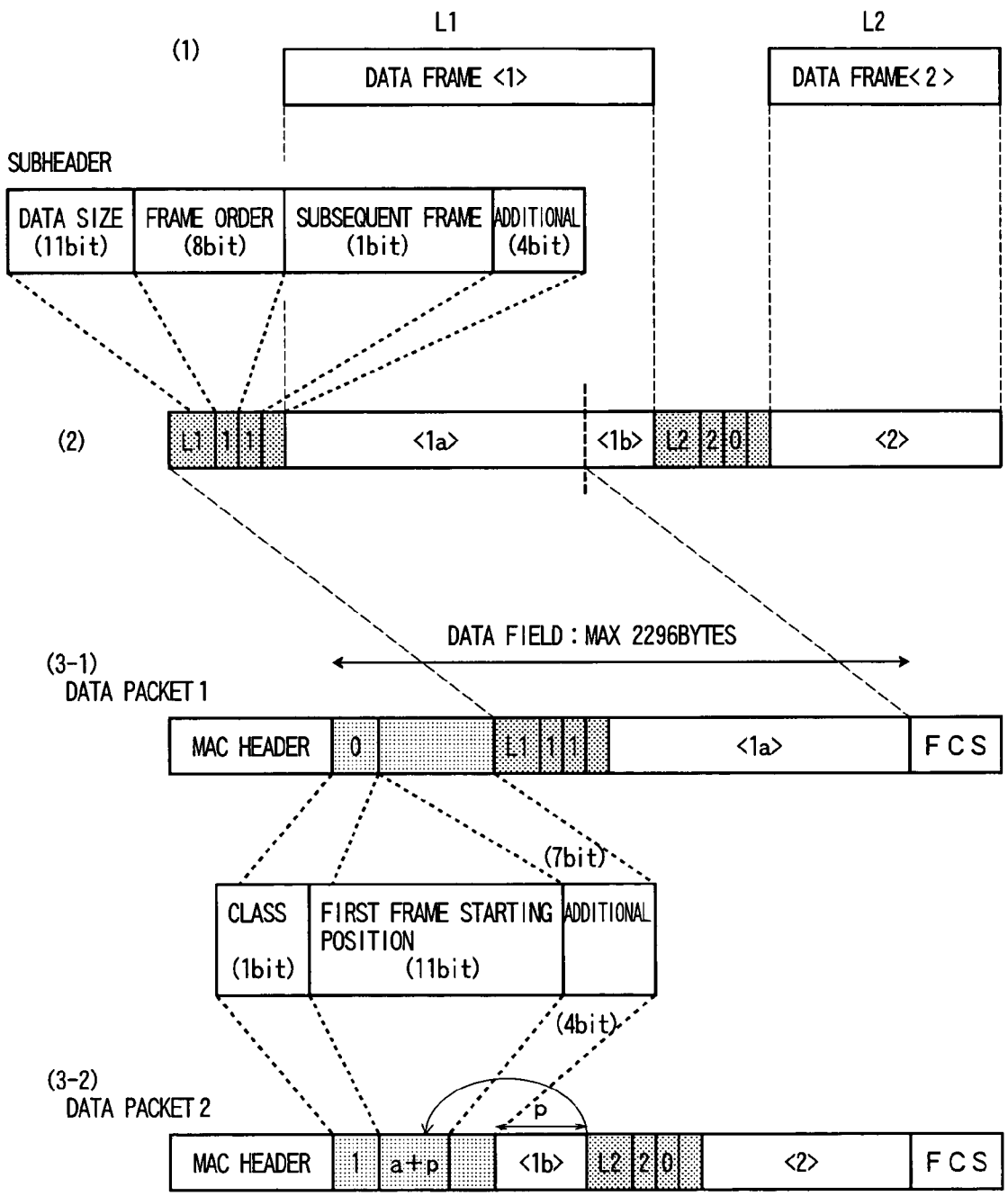
FIG. 15 are views showing the structure of the data packets according to the second frame structure example generated by the first processing procedure.

FIG. 15 show the structure of the data packets according to the second frame structure example generated by the first processing procedure. In this case, it is supposed that the number of simultaneous transmissions is two and the two data packets which have the uniform packet time length are generated by patching the two data frames.

The subheaders are respectively added to the two data frames 1 and 2, which are connected to generate the data block. This data block is divided by two as the number of simultaneous transmissions, so that the two data blocks having the uniform packet time length are generated. In this case, the first data block is constituted of a part of the data frame 1 (1*a*) and its subheader. The second data block is constituted of a part of the rest of the data frame 1 (1*b*), the data frame 2 and its subheader. That is, the first data block is the fragment, and the second data block is the connection of the fragment and the data frame 2.

Next, the main headers are respectively added to the two data blocks, the MAC headers (control information field of the data packet) are further added to their heads, and the FCS fields are added to their ends, to generate the data packets. The structure of the main header (2 bytes or 1 byte) is as shown in the second frame structure example in FIG. 10. The class field of the data packet 1 is "0" and the first frame starting position field which comes thereafter is not present. The class field of the data packet 2 is "1", and the value of the first field frame starting position field which comes thereafter is "a+p".

Next, the procedure of the restoring processing on the data packets 1 and 2 will be explained with reference to FIG. 16.

(1) The received plural data packets are rearranged according to the values indicating the order of the data packets included in the MAC headers of the respective data packets received. In this case, the data packets are rearranged in the order of 1 and 2 and the following processing is performed.

(2) According to the values of the class fields in the main headers of the data packets 1 and 2, the structure of the main headers according to the number of data frames and fragments included in the data packets 1 and 2 is confirmed. In this case, it is confirmed that the first frame starting position field is included in the main header of the data packet 2. Further, it is confirmed that the first frame starting position field is not included in the main header of the data packet 1. Incidentally, it is confirmed that one data frame or fragment included in the data packet 1 is one fragment according to the information of the MAC header. Alternately, it may be determined that the data packet 1 is the fragment because the subsequent data size is small relative to the frame size of the subheader of the data packet 1.

(3) The data packet 1 is constituted of the fragment, and the fragment in the data packet 1 is temporarily stored for the connecting processing with the fragment at the head of the data packet 2.

(4) According to the value of the first frame starting position field in the main header of the data packet 2, the starting position (a+p) of the subheader of the first frame is recognized.

(5) According to the data size (L2) and the frame order (2) of the subheader at the first frame starting position of the data packet 2, the data section of the corresponding data frame 2 is cut. At this time, the frame order and the presence/absence of the subsequent frame of the data frame 2 are managed correspondingly.

(6) In the connecting processing on the fragment of the data packet 2, the fragment at the end of the data packet 1 (the subheader and a part of the data section (1*a*) of the data frame 1) and the fragment at the head of the data packet 2 (a part of the data section (1*b*) of the data frame 1) are connected. Then, according to the data size (L1) and the frame order (1) of the subheader, the data section of the corresponding data frame 1 is cut. At this time, the frame order and the presence/absence of the subsequent frame of the data frame 1 are managed correspondingly.

By thus utilizing the information of the main headers and the subheaders of the respective data packets, it is possible to restore from the received two data packets 1 and 2 the two data packets 1 and 2 which are patched on the transmit side. Incidentally, since the subsequent frame field of the subheader of the data frame 2 is "0" and the data frames 1 and 2 are restored, it is confirmed that all the data packets 1 and 2 which are transmitted simultaneously are received.

(Generating/Restoring Processing on Special Format: Second Processing Procedure)

Figure 17:
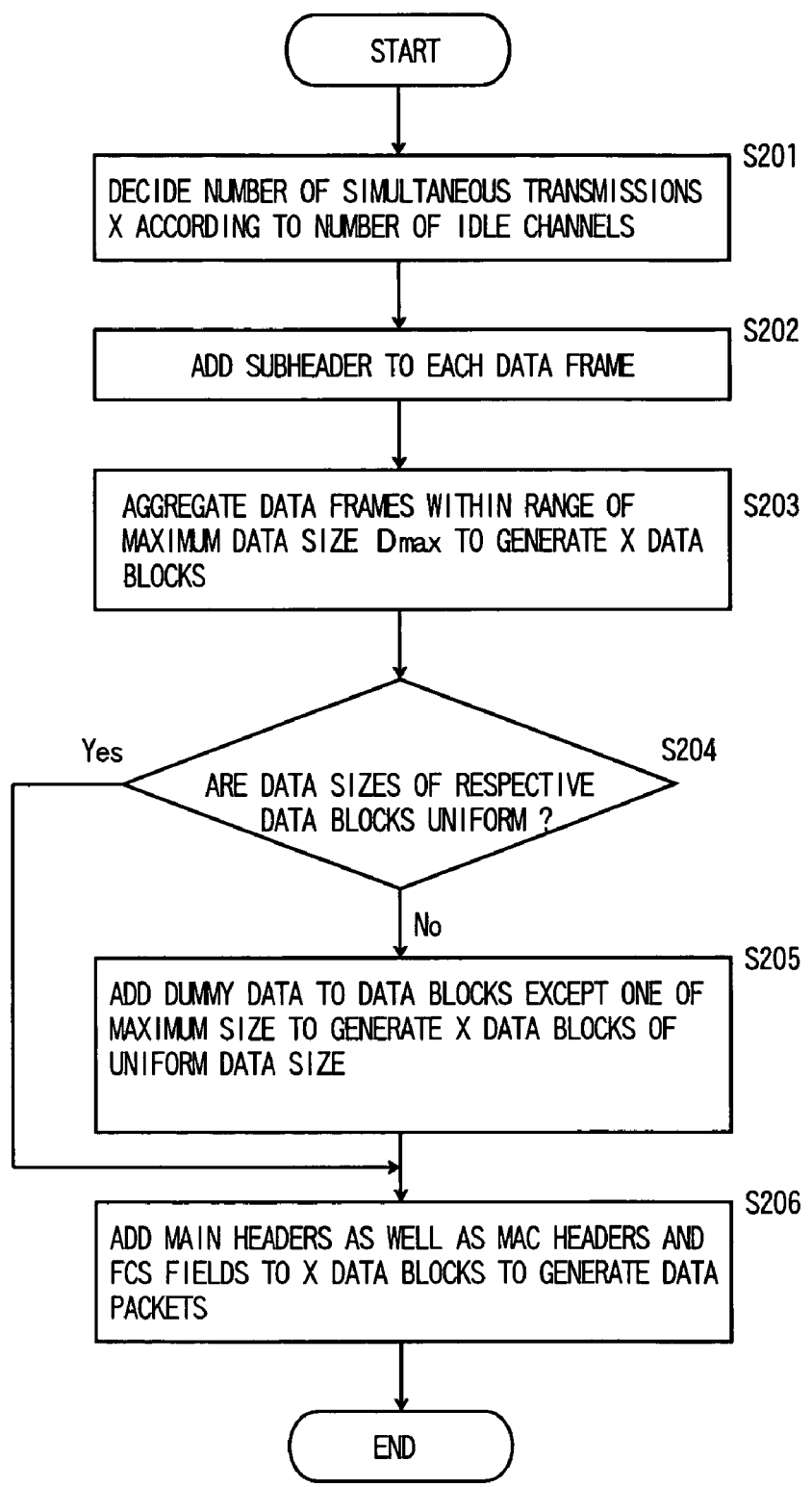
FIG. 17 is a flowchart showing a second processing procedure for generating the data packets in the special format.
Figure 18:
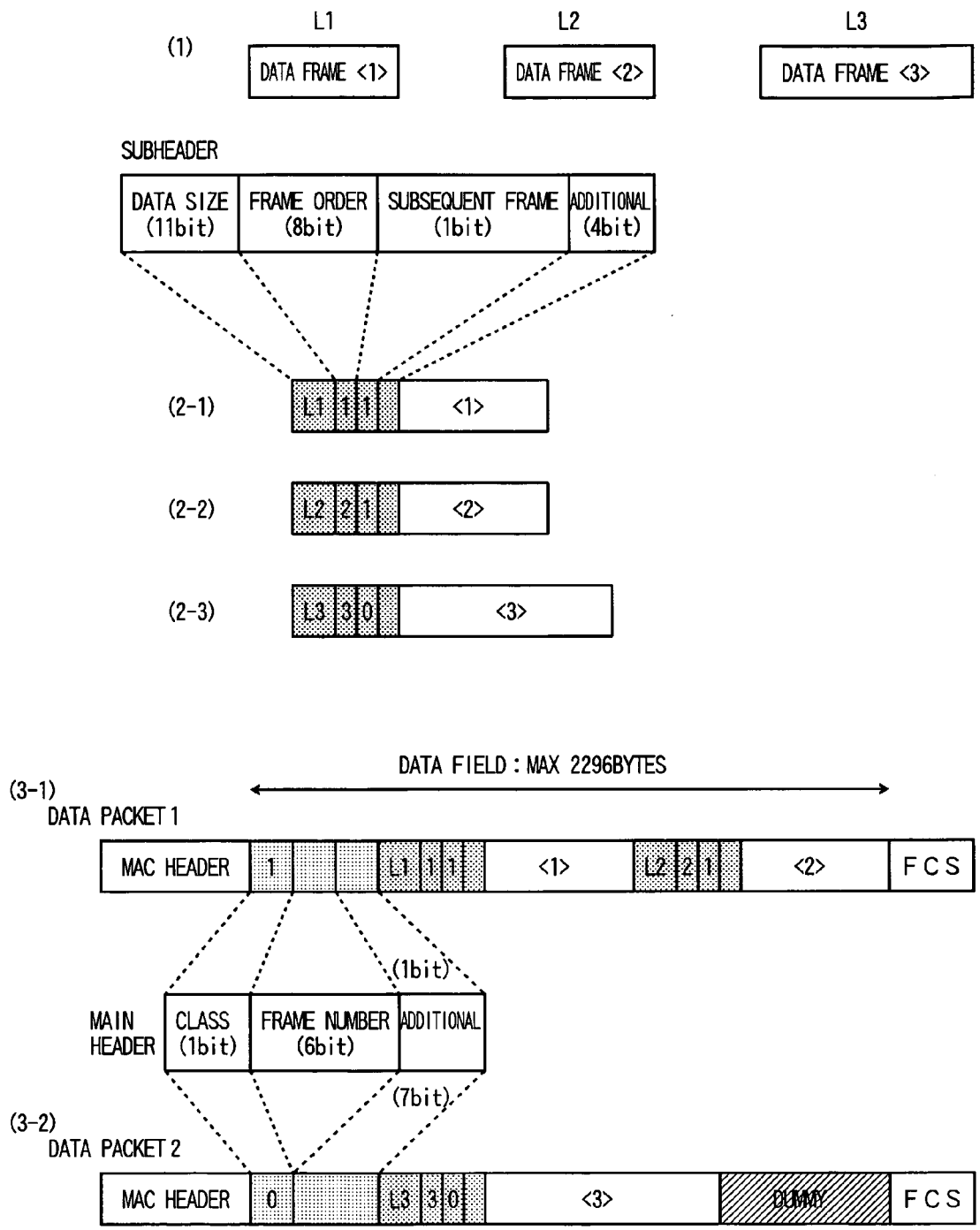
FIG. 18 are views showing the structure of the data packets according to the third frame structure example generated by the second processing procedure.

FIG. 17 shows a second processing procedure for generating the data packets in the special format. FIG. 18 show the structure of the data packets according to the third frame structure example generated by the second processing procedure. In this case, it is supposed that the number of simultaneous transmissions is two and the two data packets having the uniform packet time length are generated by connecting of the three data frames as shown in FIG. 24(3).

In FIG. 17 and FIG. 18, the number of simultaneous transmissions X is decided according to the number of idle channels in the first step S201. Incidentally, when the MIMO is used together, the number of simultaneous transmissions X becomes the total number of MIMOs of the respective wireless channels. In this case, it is supposed that the transmission rates of the respective transmission mediums used for the simultaneous transmission are the same.

In the next step S202, the subheaders are respectively added to the respective data frames. The structure of the subheader (3 bytes) is as shown in FIG. 11(1). The subsequent frame field in the data frames 1 and 2, for example, becomes "1" because there is the subsequent frame, and "0" in the data frame 3 because there is no subsequent frame.

In the next step S203, supposing that the maximum data size of the data packet to be transmitted is Dmax, the data frames are aggregated within the range of the maximum data size, to generate the X data blocks. In the next steps S204 and S205, the data sizes of the respective data blocks are compared and, when the data sizes are not uniform, dummy data is added to the data blocks so that these become uniform with the data block having the maximum size, to thereby make the data sizes of all the data blocks uniform. In this case, the first data block is constituted of the data frame 1, its subheader, the data frame 2 and its subheader. The second data block is constituted of the data frame 3, its subheader and the dummy bits.

In the next step S206, the main headers are respectively added to the X data blocks, the MAC headers (control information field of the data packet) are further added to these heads, and the FCS fields are added to these ends, to generate the data packets. The structure of the main header (1 byte) is as shown in FIG. 11(1).

The number of frames in the data packet 1 is two, and is indicated in the frame number field. The number of frame in the data packet 2 is one, but it is determined that the frame number is one when there is no frame number field.

Figure 19:
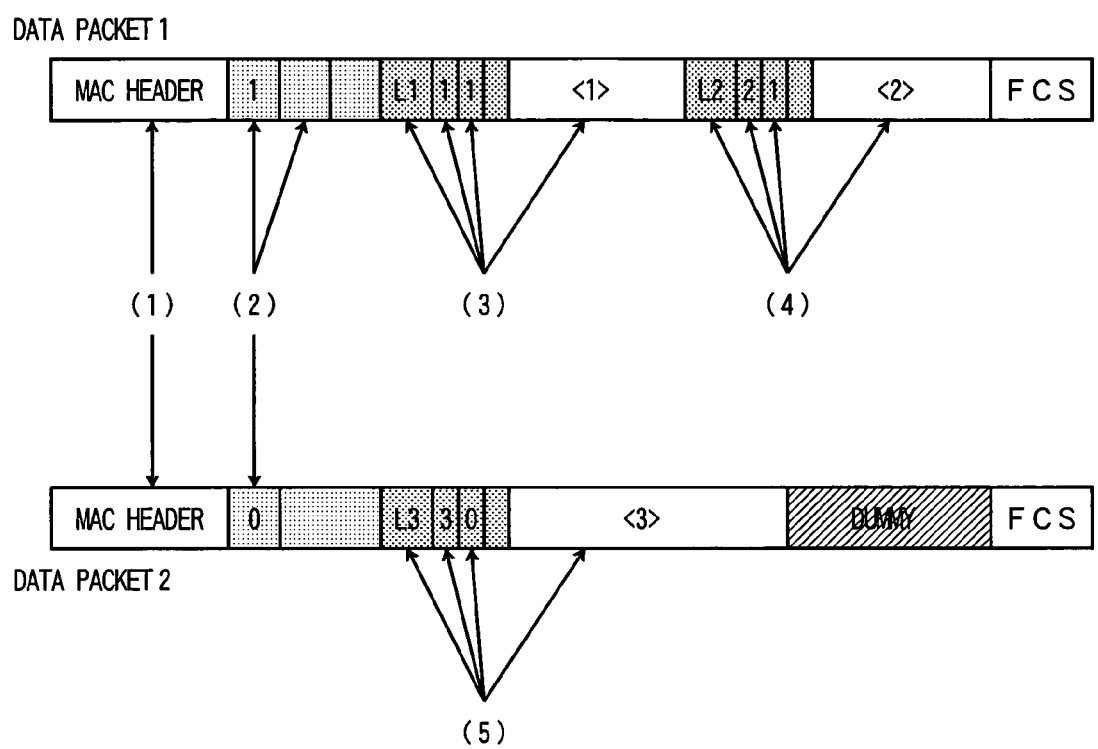
FIG. 19 is a view explaining the procedure of the restoring processing on the data packets 1 and 2 according to the third frame structure example generated by the second processing procedure.

Next, the procedure of the restoring processing on the data packets 1 and 2 will be explained with reference to FIG. 19.

(1) The received plural data packets are rearranged according to the values indicating the order of the data packets included in the MAC headers of the respective data packets received. In this case, the data packets are rearranged in the order of 1 and 2 and the following processing is performed.

(2) According to the values of the class fields in the main headers of the data packets 1 and 2, the structure of the main headers according to the number of data frames included in the data packets 1 and 2 is confirmed. In this case, it is confirmed that the frame number field is included in the main header of the data packet 1. Further, it is confirmed that the frame number field is not included in the main header of the data packet 2.

(3) According to the data size (L1) and the frame order (1) of the subheader of the first frame of the data packet 1, the data section of the corresponding data frame 1 is cut. At this time, the frame order and the presence/absence of the subsequent frame of the data frame 1 are managed correspondingly.

(4) According to the data size (L2) and the frame order (2) of the subheader of the second frame of the data packet 1, the data section of the corresponding data frame 2 is cut. At this time, the frame order and the presence/absence of the subsequent frame of the data frame 2 are managed correspondingly.

(5) According to the data size (L3) and the frame order (3) of the subheader of the first frame of the data packet 2, the data section of the corresponding data frame 3 is cut. At this time, the frame order and the presence/absence of the subsequent frame of the data frame 3 are managed correspondingly. The dummy data is voided.

By thus utilizing the information of the main headers and the subheaders of the respective data packets, it is possible to restore from the received two data packets 1 and 2 the three data frames 1, 2 and 3 which are connected on the transmit side. Incidentally, since the subsequent frame field of the subheader of the data frame 3 is "0" and the data frames 1, 2 and 3 are restored, it is confirmed that all the data packets 1 and 2 which are transmitted simultaneously are received.

Figure 20:
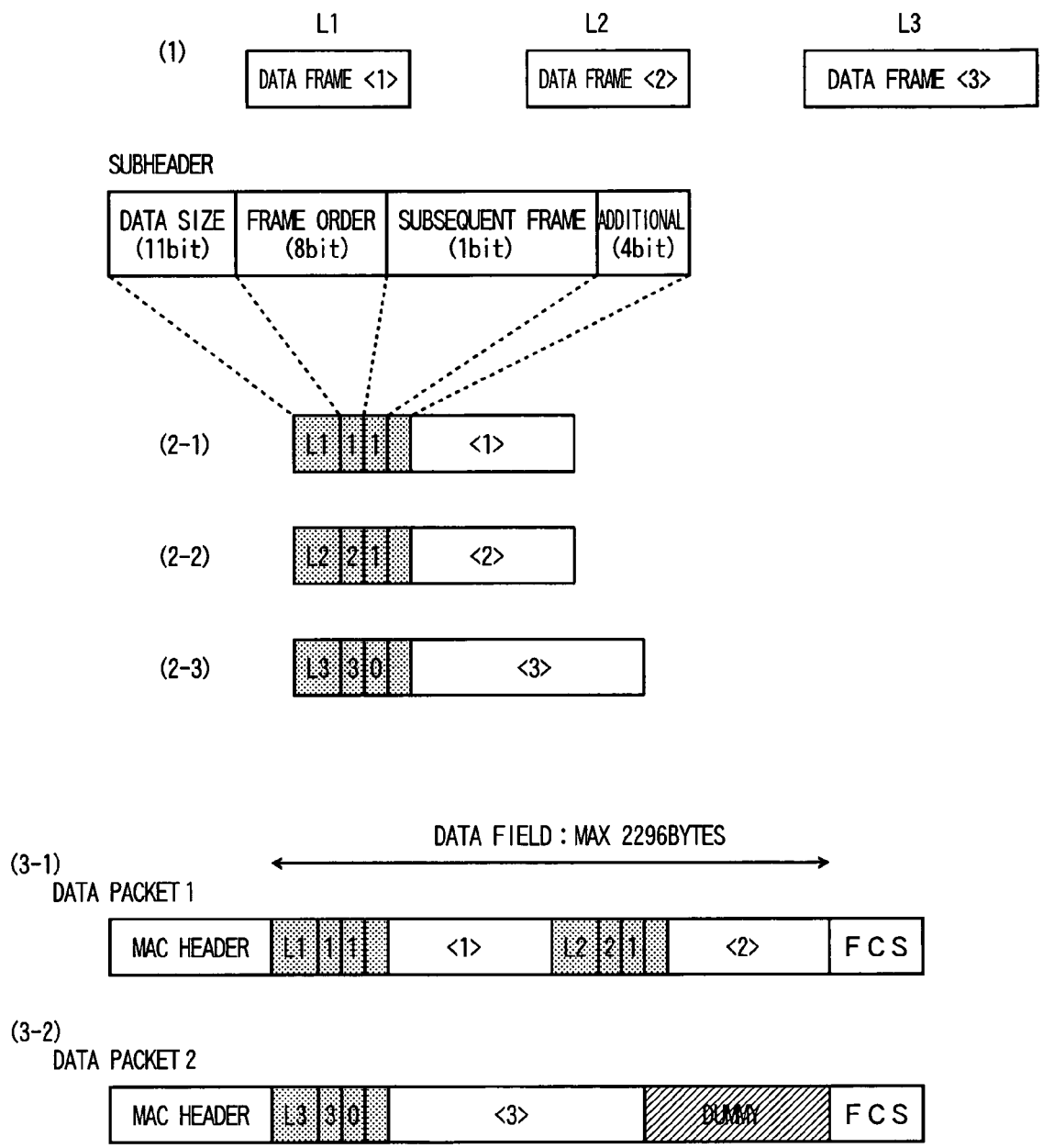
FIG. 20 are views showing the structure of the data packets according to the fourth frame structure example generated by the second processing procedure.

FIG. 20 show the structure of the data packets according to the fourth frame structure example generated by the second processing procedure. In this case, it is supposed that the number of simultaneous transmissions is two and the two data packets having the uniform packet time length are generated by aggregating the three data frames.

The subheaders are respectively added to the three data frames 1, 2 and 3, and these are aggregated to generate the two data blocks having the uniform packet time length. Next, the MAC headers (control information field of the data packet) are added to the respective heads of the two data blocks, and the FCS fields are added to these ends, to generate the data packets. In this case, the main headers are not added in the step S206 of the second processing procedure shown in FIG. 17.

Next, the procedure of the restoring processing on the data packets 1 and 2 will be explained with reference to FIG. 21.

(1) The received plural data packets are rearranged according to the values indicating the order of the data packets included in the MAC headers of the respective data packets received. In this case, the data packets are rearranged in the order of 1 and 2 and the following processing is performed.

(2) According to the data size (L1) and the frame order (1) of the subheader of the first frame of the data packet 1, the data section of the corresponding data frame 1 is cut. At this time, the frame order and the presence/absence of the subsequent frame of the data frame 1 are managed correspondingly.

(3) According to the data size (L2) and the frame order (2) of the subheader of the second frame of the data packet 1, the data section of the corresponding data frame 2 is cut. At this time, the frame order and the presence/absence of the subsequent frame of the data frame 2 are managed correspondingly.

(4) According to the data size (L3) and the frame order (3) of the subheader of the first frame of the data packet 2, the data section of the corresponding data frame 3 is cut. At this time, the frame order and the presence/absence of the subsequent frame of the data frame 3 are managed correspondingly. The dummy data is voided.

By thus utilizing the information of the subheaders of the respective data packets, it is possible to restore from the received two data packets 1 and 2 the three data frames 1, 2 and 3 which are connected on the transmit side. Incidentally, since the subsequent frame field of the subheader of the data frame 3 is "0" and the data frames 1, 2 and 3 are restored, it is confirmed that all the data packets 1 and 2 which are transmitted simultaneously are received.

Figure 23:
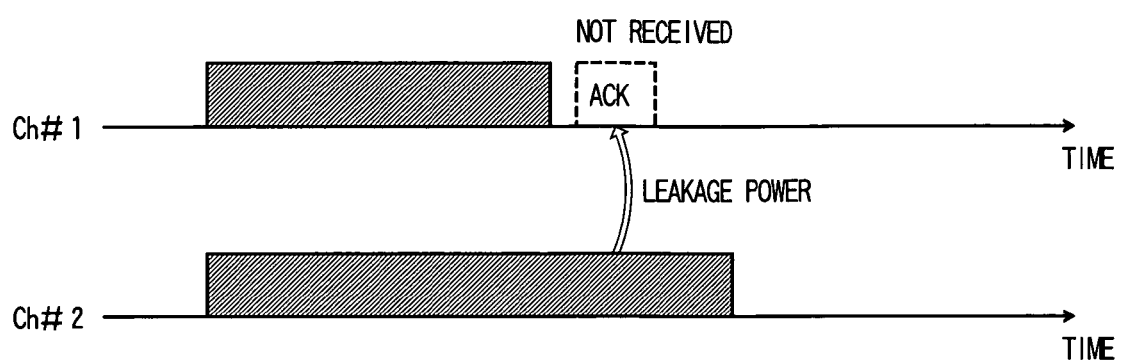
FIG. 23 is a time chart explaining the problem when central frequencies of multiple wireless channels are close to each other.

Incidentally, a difference in the packet time lengths is caused between the data packets 1 and 2 shown in FIG. 15 and between the data packets 1 and 2 shown in FIG. 18 due to the difference in the structure of the main header. However, since the difference is about 2 bytes at the most and a difference in the transmission times between the data packets 1 and 2 is small, the problem that an ACK packet cannot be received as shown in FIG. 23 is not caused. It should be noted that the length of the additional field may be adjusted so that the packet time lengths become the same.

Further, when the data packet is constituted of the patched data frames, the frame structure in the case where the value of the class field is "1" as shown in FIG. 9 or FIG. 10 may be employed even when it is "0". In this case, the class field may be omitted. Furthermore, when the data packet is constituted of the aggregated data frames, the frame structure in the case where the value of the class field is "1" as shown in FIG. 11(1) may be employed even when it is "0". In this case, the class field may be omitted.

(Structure Example of Wireless Packet Communication Apparatus)

Figure 22:
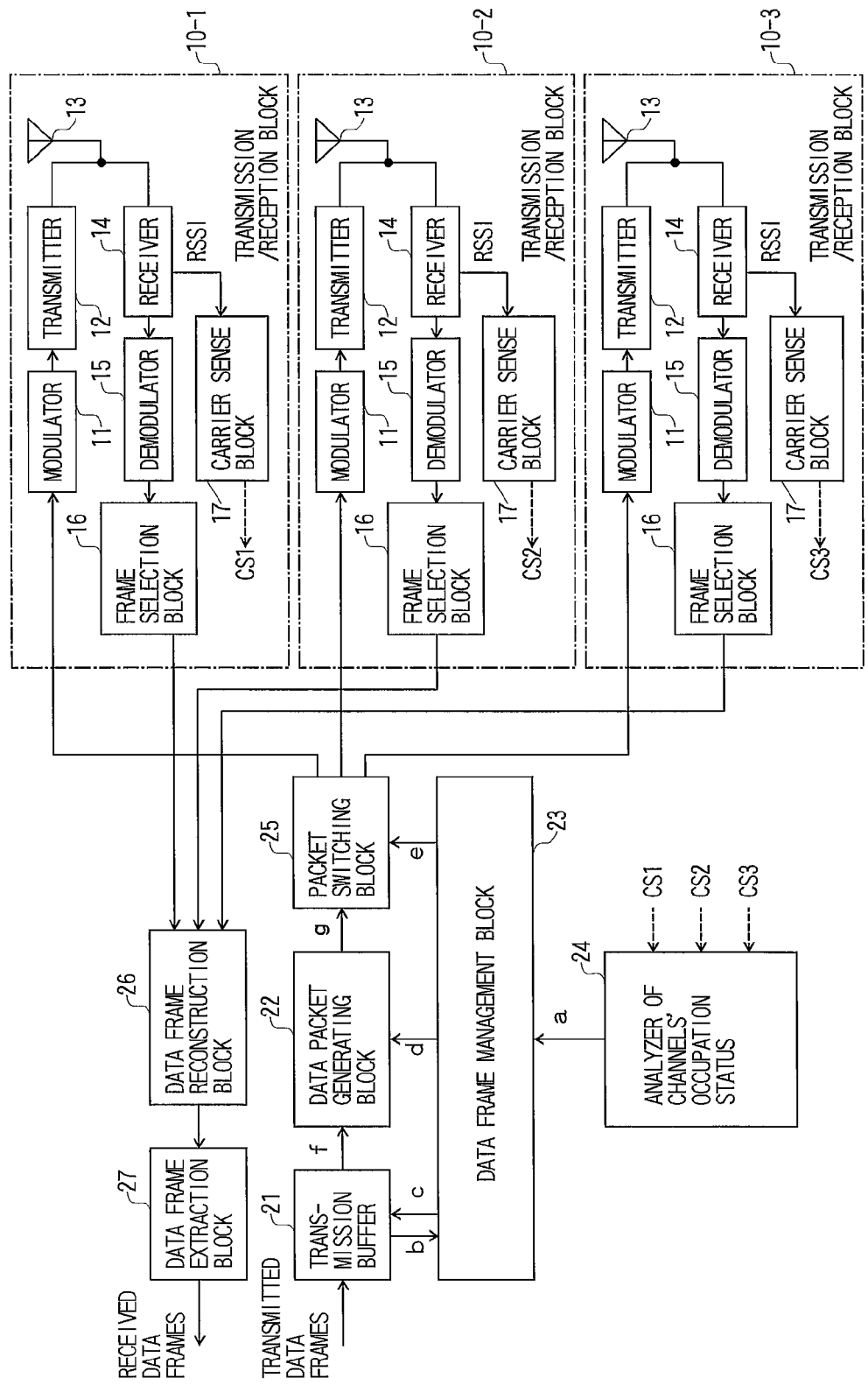
FIG. 22 is a block diagram showing a structure example of a wireless packet communication apparatus to which the wireless packet communication method according to the present invention is applied.

FIG. 22 shows a structure example of a wireless packet communication apparatus to which the wireless packet communication method according to the present invention is applied. In this case, the structure of the wireless packet communication apparatus which can transmit/receive the three data packets simultaneously using three wireless channels #1, #2 and #3 is shown, but the number of simultaneous can be set arbitrarily. Incidentally, for use of the MIMO for each wireless channel, data packets can be transmitted/received simultaneously in the number of simultaneous transmissions corresponding to the total number of MIMOs of the multiple wireless channels, but the description on the MIMO is omitted herein.

In the drawing, the wireless packet communication apparatus includes transmission/reception blocks 10-1, 10-2 and 10-3, a transmission buffer 21, a data packet generating block 22, a data packet management block 23, an analyzer of channels' occupation status, a packet switching block 25, a data frame restoring block 26 and a data frame extraction block 27.

The transmission/reception blocks 10-1, 10-2 and 10-3 perform radio communication using the wireless channels #1, #2 and #3 which are different from each other. These wireless channels are independent of each other because radio frequencies and the like are different from each other, and are so structured that the wireless communication using the multiple wireless channels simultaneously is possible. Each transmission/reception block 10 includes a modulator 11, a transmitter 12, an antenna 13, a receiver 14, a demodulator 15, a frame selection block 16 and a carrier sense block 17.

Radio frequency signals which are transmitted by another wireless packet communication apparatus through the wireless channels #1, #2 and #3 which are different from each other are respectively inputted into the receivers 14 via the antennas 13 of the corresponding transmission/reception blocks 10-1, 10-2 and 10-3. The receiver 14 corresponding to each wireless channel subjects the inputted radio frequency signal to receiving processing including frequency conversion, filtering, quadrature detection and AD conversion. Incidentally, a radio frequency signal on a radio propagation path of each wireless channel is inputted into each receiver 14 at all times when each antenna 13 which is connected thereto is not used for the transmission, and an RSSI signal indicating received field strength of each wireless channel is outputted to the carrier sense block 17. Further, when the radio frequency signal is received in the wireless channel corresponding to the receiver 14, a baseband signal which is subjected to the receiving processing is outputted to the demodulator 15.

The demodulator 15 subjects the baseband signal which is inputted from the receiver 14 to demodulating processing, and outputs the obtained data packet to the frame selection block 16. The frame selection block 16 performs a CRC check of the inputted data packet and, when the data packet is received without fault, identifies whether the data packet is transmitted to the local station or not. That is, it checks whether a destination ID of each data packet agrees with that of the local station, outputs the data packet addressed to the own station to the data frame restoring block 26, and performs response processing by generating an acknowledge packet in a not-shown acknowledge packet generating block and transmitting it to the modulator 11. At this time, in transmitting the acknowledge packet, the setting of the transmission rate and the setting of transmission modes such as not applying the MIMO and the like may be made. Meanwhile, when the data packet is not addressed to the own station, the packet is voided in the frame selection block 16.

The data frame restoring block 26 uses the above-described procedure of the restoring processing on the data frames to extract the data frames from the data packet. Its result is outputted to the data frame extraction block 27 as a received data frames. The data frame extraction block 27 removes header sections from the respective data frames included in the inputted received data frames, and outputs it.

When the RSSI signal is inputted, the carrier sense block 17 compares the value of the received field strength indicated by the signal with a threshold value which is set in advance. Then, when the state continues in which the received field strength is smaller than the threshold value continuously during a predetermined period, it determines that the allocated wireless channel is available, and in other cases it determines that the allocated wireless channel is busy. The carrier sense block 17 corresponding to each wireless channel outputs this determination result as carrier detecting results CS1 to CS3. Incidentally, in each transmission/reception block 10, the RSSI signal is not inputted into the carrier sense block 17 when the antenna 13 is in a transmitting state. Further, when the antenna 13 is already in the transmitting state, it is impossible to simultaneously transmit another data packet as the radio frequency signal using the same antenna 13. Therefore, when the RSSI signal is not inputted, each carrier sense block 17 outputs the carrier detecting result indicating that the allocated wireless channel is busy.

The carrier detecting results CS1 to CS3 which are outputted from the carrier sense blocks 17 corresponding to the respective wireless channels are inputted into the analyzer of channels' occupation status 24. The analyzer of channels' occupation status 24 manages the availability of the respective wireless channels based on the carrier detecting results corresponding to the respective wireless channels, and notifies the data packet management block 23 of the information such as the available wireless channels and the number of idle channels (FIG. 22, a).

Meanwhile, a transmission data frames to be transmitted is inputted and buffered into the transmission buffer 21. This transmission data frames is constituted of one or a plurality of data frame(s). The transmission buffer 21 sequentially notifies the data packet management block 23 of the number of data frames currently held, ID information of the destined wireless packet communication apparatus, data size, address information indicating the position on the buffer and the like (b).

Based on the information on the data frames for each of the destination STA IDs notified by the transmission buffer 21 and the information on the wireless channels notified by the analyzer of channels' occupation status 24, the data packet management block 23 decides how and from which data frames the data packets are generated and which wireless channels are used for the transmission, which are notified to the transmission buffer 21, the data packet generating block 22 and the data packet switching block 25, respectively (c, d and e). For example, when the number of available wireless channels N is smaller than the number of data frames K in the transmission stand-by state in the transmission buffer 21, it determines that the number of available wireless channels N is the number of data packets to be transmitted simultaneously, determines the data frames to be transmitted out of the K data frames so that these become equal to or lower than N×Dmax, and notifies the transmission buffer 21 of the address information designating it (c). Further, it notifies the data packet generating block 22 of the information for generating the N data packets from the data frames inputted from the transmission buffer 21(d). Furthermore, it gives an instruction to the packet switching block 25 about the correspondence between the N data packets generated in the data packet generating block 22 and the available wireless channels (e).

The transmission buffer 21 outputs the data frames which are designated to output to the data packet generating block 22(f). The data packet generating block 22 extracts the data fields from the respective data frames, cuts and pastes these after adding the above-described subheaders, generates the plural data blocks having the uniform packet time length, and adds to these data blocks header sections each of which includes ID information of the destination STA as the destination of the data packet and control information such as a sequence number showing the order of the data frame, and CRC codes (FCS sections) as error detecting codes, to generate the data packets. The packet switching block 25 correlates the respective data packets inputted from the data packet generating block 22 with the respective wireless channels.

As a result of this correlation, the data packet correlated with the wireless channel #1 is inputted into the modulator 11 in the transmission/reception block 10-1, the data packet correlated with the wireless channel #2 is inputted into the modulator 11 in the transmission/reception block 10-2, and the data packet correlated with the wireless channel #3 is inputted into the modulator 11 in the transmission/reception block 10-3. When the data packet is inputted from the packet switching block 25, each modulator 11 subjects the data packet to predetermined modulating processing and outputs it to the transmitter 12. Each transmitter 12 subjects the data packet which is inputted from the modulator 11 after the modulating processing to transmitting processing including DA conversion, frequency conversion, filtering and power amplification, and transmits it as the data packet from the antenna 13 through the corresponding wireless channel.

The invention is not limited to the above embodiments and various modifications may be made without departing from the spirit and scope of the invention. Any improvement may be made in part or all of the components.

INDUSTRIAL APPLICABILITY

According to the present invention, the special format of one or the plural data packet(s) which is/are generated by connecting or patching the plural data frames can be prescribed. Thereby, it is possible to transmit/receive the data packet in the special format including the plural data frames, and to realize drastic improvement in maximum throughput and efficient wireless packet communication.

Moreover, even in the system in which the STA supporting the special format and the STA supporting the standard format only are mixed, it is possible to identify the corresponding formats between the STAs, generate the data packet in the corresponding format, and transmit/receive it. Thereby, it is possible to improve the throughput while applying to the system in which the new STA supporting the special format and the existing STA supporting the standard format only are both used.

What is claimed is:

1. A wireless packet communication method for generating a plurality of data packets in a special format in which a plurality of data frames are patched, and transmitting the data packets from one station ("STA") via a network to another station, characterized by comprising:

adding, to each of said plurality of data frames, a subheader including a field indicating a data size, a field indicating an order of a frame, and a field indicating presence/absence of a subsequent frame;

generating one data block by connecting the data frames having the subheaders added thereto, and generating a number of data blocks by dividing the one data block so that the data blocks have a uniform packet time length, the number of data blocks corresponding to a number of simultaneous transmissions;

adding a main header to each of the number of data blocks corresponding to the number of simultaneous transmissions, and adding a control information field of the data packet before each of the data blocks having the main header added thereto and adding a frame check field of the data packet thereafter, to generate the data packets, the main header including information necessary to restore the patched data frames;

transmitting a request packet from an STA supporting the special format before transmitting the data packet, the request packet being receivable only by an STA supporting the special format;

managing, by an STA having received said request packet and supporting the special format, a transmit-side STA of said request packet as one supporting the special format, and transmitting therefrom to the transmit-side STA a reply packet which is receivable only by the STA supporting the special format;

managing the transmit-side STA of said reply packet as one supporting the special format, by the STA having received said request packet and supporting the special format; and transmitting, according to management information in an own station, the data packet in the special format when a receive-side STA supports the special format, and transmitting the data packet in a standard format generated from one data frame when the receive-side STA does not support the special format.

2. The wireless packet communication method according to claim 1, characterized by further comprising:

setting, by the STA transmitting a data packet, format identification information in a control information field of a data packet to be transmitted, the format identification information at least indicating a distinction between the standard format and special format; and selecting, by the STA having received the data packet, the standard format or special format according to contents of said format identification information included in the control information field in the received data packet, and subjecting the data packet to reception processing according to a definition of the selected format.

3. The wireless packet communication method according to claim 1, characterized by further comprising identifying, by the STA having received the data packet, the transmit-side STA from a control information field in the received data packet, recognizing, according to the management information in the own station, a format which the transmit-side STA supports, and subjecting the data packet to reception processing according to a definition of the recognized format.

4. The wireless packet communication method according to claim 1, characterized in that said main header includes: a class field indicating a structure of the main header according to numbers of data frames and fragments in the data packet; a frame number field indicating a number of frames in the data packet; a first frame starting position field indicating a frame starting position in the data packet in unit of byte; and a fragment field indicating presence/absence of a fragment as a divided data frame and a position thereof.

5. The wireless packet communication method according to claim 1, characterized in that said main header includes: a class field indicating a structure of the main header according to numbers of data frames and fragments in the data packet; and a first frame starting position field indicating a frame starting position in the data packet in unit of byte.

6. The wireless packet communication method according to claim 4 or claim 5, characterized in that said main header is formed without the field(s) except for the class field when the numbers of data frames and fragments in the data packet are one.

7. The wireless packet communication method according to claim 4, characterized by further comprising:

checking the structure of the main header according to a value of the class field of the main header in each data packet received;

recognizing a starting position of the subheader of the data frame according a value of the first frame starting position field of the main header in the data packet, and cutting out a corresponding data frame from a data size of the subheader;

according to values of the frame number field and the fragment field of the main header in the data packet, cutting out a corresponding data frame from the data size of the subheader when a data frame follows, and performing connecting processing with a fragment at a head of a subsequent data packet when a fragment follows; and restoring the plurality of data frames included in each data packet received.

8. The wireless packet communication method according to claim 5, characterized by further comprising:

checking the structure of the main header according to a value of the class field of the main header in each data packet received;

recognizing a starting position of the subheader of the data frame according a value of the first frame starting position field of the main header in the data packet, and cutting out a corresponding data frame from a data size of the subheader;

comparing the data size of the subheader following the cut-out data frame with a size of a portion subsequent to the subheader to distinguish whether it is a data frame or a fragment as a divided data frame, cutting out a corresponding data frame from the data size of the subheader when a data frame follows, and performing connecting processing with a fragment at a head of a subsequent data packet when a fragment follows; and restoring the plurality of data frames included in each data packet received.

9. The wireless packet communication method according to claim 6, characterized by further comprising:

checking the structure of the main header according to a value of the class field of the main header in each data packet received;

comparing the data size of the subheader with a size of a portion subsequent to the subheader to distinguish whether it is a data frame or a fragment as a divided data frame, when the numbers of data frames and fragments are one according to the structure of said class field, cutting out a corresponding data frame from the data size of the subheader when a data frame follows, and performing connecting processing with a fragment at a head of a subsequent data packet when a fragment follows; and restoring the data frame included in the received data packet.

10. A wireless packet communication method for generating one or a plurality of data packet(s) in a special format in which a plurality of data frames are aggregated, and for transmitting the data packet(s) from one station ("STA") via a network to another station, characterized by comprising:

adding subheaders to the data frames, the subheaders each including a field indicating a data size, a field indicating an order of a frame, and a field indicating presence/absence of a subsequent frame;

generating a data block by aggregating the data frames having the subheaders added thereto;

adding a main header to the data block, and adding a control information field of the data packet before the data block having the main header added thereto and adding a frame check field of the data packet thereafter, to generate the data packet, the main header including information necessary to restore the aggregated data frames;

transmitting a request packet from an STA supporting the special format before transmitting the data packet, the request packet being receivable only by an STA supporting the special format;

managing, by an STA having received said request packet and supporting the special format, a transmit-side STA of said request packet as one supporting the special format, and transmitting therefrom to the transmit-side STA a reply packet which is receivable only by the STA supporting the special format;

managing the transmit-side STA of said reply packet as one supporting the special format, by the STA having received said request packet and supporting the special format; and transmitting, according to management information in an own station, the data packet in the special format when a receive-side STA supports the special format, and transmitting the data packet in a standard format generated from one data frame when the receive-side STA does not support the special format.

11. The wireless packet communication method according to claim 10, characterized in that said main header includes a class field indicating a structure of the main header according to a number of data frames in the data packet, and a frame number field indicating a number of frames in the data packet.

12. The wireless packet communication method according to claim 11, characterized by further comprising forming the main header without the fields except for said class field when the number of data frames in the data packet is one.

13. The wireless packet communication method according to claim 11, characterized by further comprising:

checking the structure of the class field according to a value of the class field of the main header in each data packet received;

cutting out, for each of the data packets, corresponding data frames sequentially from data sizes of subheaders of the data frames according to a value of the frame number field of the main header; and restoring the data frames included in the received data packet.

14. The wireless packet communication method according to claim 12, characterized by further comprising:

checking the structure of the class field according to a value of the class field of the main header in each data packet received;

cutting out, for each of the data packets, corresponding data frames sequentially from the data size of the subheader of the data frame; and restoring the data frame included in the received data packet.

15. The wireless packet communication method according to claim 10, characterized by further comprising:

setting, by the STA transmitting a data packet, format identification information in a control information field of a data packet to be transmitted, the format identification information at least indicating a distinction between the standard format and special format; and selecting, by the STA having received the data packet, the standard format or special format according to contents of said format identification information included in the control information field in the received data packet, and subjecting the data packet to reception processing according to a definition of the selected format.

16. The wireless packet communication method according to claim 10, characterized by further comprising identifying, by the STA having received the data packet, the transmit-side STA from a control information field in the received data packet, recognizing, according to the management information in the own station, a format which the transmit-side STA supports, and subjecting the data packet to reception processing according to a definition of the recognized format.

* * * * *